(12) United States Patent
Kurihara et al.

(10) Patent No.: US 10,030,198 B2
(45) Date of Patent: Jul. 24, 2018

(54) LIQUID CRYSTAL COMPOSITION AND LIQUID CRYSTAL DISPLAY DEVICE

(71) Applicants: JNC CORPORATION, Tokyo (JP); JNC PETROCHEMICAL CORPORATION, Tokyo (JP)

(72) Inventors: Eriko Kurihara, Chiba (JP); Masayuki Saito, Chiba (JP); Yoshimasa Furusato, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 0 days.

(21) Appl. No.: 14/519,133

(22) Filed: Oct. 21, 2014

(65) Prior Publication Data

US 2015/0108402 A1 Apr. 23, 2015

(30) Foreign Application Priority Data

Oct. 23, 2013 (JP) .................. 2013-219952

(51) Int. Cl.
| | | |
|---|---|---|
| G02F 1/1333 | (2006.01) |
| C09K 19/30 | (2006.01) |
| C09K 19/12 | (2006.01) |
| C09K 19/34 | (2006.01) |
| C09K 19/10 | (2006.01) |
| C09K 19/54 | (2006.01) |

(52) U.S. Cl.
CPC .......... *C09K 19/3068* (2013.01); *C09K 19/10* (2013.01); *C09K 19/12* (2013.01); *C09K 19/3003* (2013.01); *C09K 19/3066* (2013.01); *C09K 19/3402* (2013.01); *C09K 2019/122* (2013.01); *C09K 2019/301* (2013.01); *C09K 2019/3004* (2013.01); *C09K 2019/3009* (2013.01); *C09K 2019/3015* (2013.01); *C09K 2019/3016* (2013.01); *C09K 2019/3021* (2013.01); *C09K 2019/3071* (2013.01); *C09K 2019/3422* (2013.01); *C09K 2019/548* (2013.01)

(58) Field of Classification Search
CPC ................ C09K 19/3068; C09K 19/12; C09K 19/3003; C09K 19/3066; C09K 19/3402; C09K 19/10; C09K 2019/3004; C09K 2019/301; C09K 2019/3009; C09K 2019/3016; C09K 2019/122; C09K 2019/3015; C09K 2019/3021; C09K 2019/3071; C09K 2019/3422; C09K 2019/548; G02F 1/1333
USPC .......................................... 252/299.6; 428/1.1
See application file for complete search history.

(56) References Cited

U.S. PATENT DOCUMENTS

| 7,597,943 B2 * | 10/2009 | Saito ...................... C09K 19/14 |
| | | 252/299.63 |
| 8,304,037 B2 * | 11/2012 | Yano .................. C09K 19/3048 |
| | | 252/299.61 |
| 8,916,063 B2 * | 12/2014 | Goto ...................... C09K 19/12 |
| | | 252/299.61 |
| 2014/0166931 A1 | 6/2014 | Goto |

FOREIGN PATENT DOCUMENTS

| EP | 1026142 | 8/2000 |
| WO | 9921815 | 5/1999 |
| WO | 2013122011 | 8/2013 |

\* cited by examiner

*Primary Examiner* — Geraldina Visconti
(74) *Attorney, Agent, or Firm* — JCIPRNET

(57) ABSTRACT

The means concerns a liquid crystal composition that has negative dielectric anisotropy and that comprises a specific compound having a high stability to ultraviolet light as a first component, wherein the composition may comprise a specific compound having a high maximum temperature or a small viscosity as a second component, and a specific compound having a large negative dielectric anisotropy as a third component, and a specific compound having a polymerizable group as an additive component.

15 Claims, No Drawings

LIQUID CRYSTAL COMPOSITION AND LIQUID CRYSTAL DISPLAY DEVICE

CROSS-REFERENCE TO RELATED APPLICATION

This application claims the priority benefit of Japan application serial no. 2013-219952, filed on Oct. 23, 2013. The entirety of the above-mentioned patent application is hereby incorporated by reference herein and made a part of this specification.

BACKGROUND OF THE INVENTION

Technical Field

The invention relates to a liquid crystal composition, a liquid crystal display device comprising this composition and so forth. It relates especially to a liquid crystal composition having negative dielectric anisotropy and an liquid crystal display device comprising this composition and having a mode such as IPS, VA, FFS or FPA. It also relates to a liquid crystal display device of a polymer sustained alignment type.

Technical Background

In a liquid crystal display device, a classification based on an operating mode for liquid crystal molecules includes modes such as PC (phase change), TN (twisted nematic), STN (super twisted nematic), ECB (electrically controlled birefringence), OCB (optically compensated bend), IPS (in-plane switching), VA (vertical alignment), FFS (fringe field switching) and FPA (field-induced photo-reactive alignment). A classification based on a driving mode in the device includes PM (passive matrix) and AM (active matrix). The PM is classified into static, multiplex and so forth, and the AM is classified into TFT (thin film transistor), MIM (metal-insulator-metal) and so forth. The TFT is further classified into amorphous silicon and polycrystal silicon. The latter is classified into a high temperature type and a low temperature type depending on the production process. A classification based on a light source includes a reflection type utilizing natural light, a transmission type utilizing a backlight and a semi-transmission type utilizing both natural light and a backlight.

The liquid crystal display device comprises a liquid crystal composition having a nematic phase. This composition has suitable characteristics. An AM device having good characteristics can be obtained by an improvement of the characteristics of this composition. Table 1 below summarizes the relationship between these two characteristics. The characteristics of the composition will be further explained on the basis of a commercially available AM device. The temperature range of a nematic phase relates to the temperature range in which the device can be used. A desirable maximum temperature of the nematic phase is approximately 70° C. or higher and a desirable minimum temperature of the nematic phase is approximately −10° C. or lower. The viscosity of the composition relates to the response time of the device. A short response time is desirable for displaying moving images on the device. Response time that is one millisecond shorter than that of the other devices is desirable. Thus a small viscosity of the composition is desirable. A small viscosity at a low temperature is more desirable.

TABLE 1

Characteristics of Compositions and AM Devices

| No. | Characteristics of Compositions | Characteristics of AM Devices |
|---|---|---|
| 1 | wide temperature range of a nematic phase | wide temperature range in which a device can be used |
| 2 | small viscosity [1] | short response time |
| 3 | suitable optical anisotropy | large contrast ratio |
| 4 | large positive or large negative dielectric anisotropy | low threshold voltage and low power consumption, large contrast ratio |
| 5 | large specific resistance | large voltage holding ratio and large contrast ratio |
| 6 | high stability to ultraviolet light and heat | long service life |

[1] A composition can be injected into a liquid crystal display device in a shorter period of time.

The optical anisotropy of the composition relates to the contrast ratio of the device. A large optical anisotropy or a small optical anisotropy, namely a suitable optical anisotropy, is necessary depending on the mode of the device. The product ($\Delta n \times d$) of the optical anisotropy ($\Delta n$) of the composition and the cell gap (d) of the device is designed so as to maximize the contrast ratio. A suitable value of the product depends on the type of operating mode. This value is in the range of approximately 0.30 micrometers to approximately 0.40 micrometers for a device having a VA mode, and in the range of approximately 0.20 micrometers to approximately 0.30 micrometers for a device having an IPS mode or an FFS mode. In these cases, a composition having a large optical anisotropy is desirable for a device having a small cell gap. A large dielectric anisotropy of the composition contributes to a low threshold voltage, low power consumption and a large contrast ratio of the device. A large dielectric anisotropy is thus desirable. A large specific resistance of the composition contributes to a large voltage holding ratio and a large contrast ratio of the device. It is thus desirable that a composition should have a large specific resistance at a temperature close to the maximum temperature of a nematic phase as well as at room temperature in the initial stages. It is desirable that a composition should have a large specific resistance in the initial stages as well as at room temperature, after it has been used for a long time. The stability of the composition to ultraviolet light and heat relates to the service life of the device. The device has a long service life when the stability is high. Characteristics of this kind are desirable for an AM device used for a liquid crystal projector, a liquid crystal television and so forth.

A liquid crystal composition comprising a polymer is used for a liquid crystal display device with a polymer sustained alignment (PSA) type. First, a composition to which a small amount of a polymerizable compound has been added is poured into a device. Next, the composition is irradiated with ultraviolet light, while a voltage is applied between the substrates of this device. The polymerizable compound is polymerized to give a network structure of a polymer in the composition. In this composition, the polymer makes it possible to adjust the orientation of liquid crystal molecules, and thus the response time of the device is decreased and image burn-in is improved. Such effect of the polymer can be expected for a device having a mode such as TN, ECB, OCB, IPS, VA, FFS or FPA.

A composition having positive dielectric anisotropy is used for an AM device having a TN mode. A composition having negative dielectric anisotropy is used for an AM device having a VA mode. A composition having positive or negative dielectric anisotropy is used for an AM device having an IPS mode or an FFS mode. A composition having positive or negative dielectric anisotropy is used for an AM device with a polymer sustained alignment mode. Examples of the liquid crystal composition having negative dielectric anisotropy are disclosed in the following patent document No. 1 or No. 2.

PRIOR ART

Patent Document

Patent document No. 1: WO 2013-122011 A.
Patent document No. 2: WO 1999-021815 A.

SUMMARY OF THE INVENTION

The invention concerns a liquid crystal composition that has negative dielectric anisotropy and comprises at least one compound selected from the group consisting of compounds represented by formula (1) as a first component, and concerns a liquid crystal display device comprising this composition:

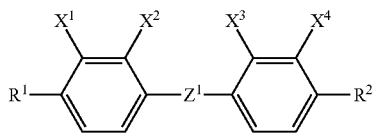

(1)

in formula (1), $R^1$ is alkyl having 1 to 12 carbons in which at least one hydrogen has been replaced by halogen; $R^2$ is alkyl having 1 to 12 carbons, alkoxy having 1 to 12 carbons, alkenyl having 2 to 12 carbons or alkenyloxy having 2 to 12 carbons; $X^1$ and $X^2$ are independently fluorine, chlorine or hydrogen; $X^3$ and $X^4$ are independently fluorine or chlorine; and $Z^1$ is a single bond, —CH$_2$CH$_2$—, —CH$_2$O—, —OCH$_2$—, —COO— or —OCO—.

DESCRIPTION OF EMBODIMENTS

Subject to be Solved by the Invention

One of the aims of the invention is to provide a liquid crystal composition that satisfies at least one of characteristics such as a high maximum temperature of a nematic phase, a low minimum temperature of a nematic phase, a small viscosity, a suitable optical anisotropy, a large negative dielectric anisotropy, a large specific resistance, a high stability to ultraviolet light and a high stability to heat. Another aim is to provide a liquid crystal composition that is suitably balanced between at least two of the characteristics. A further aim is to provide a liquid crystal display device comprising such a composition. A further aim is to provide an AM device that has characteristics such as a short response time, a large voltage holding ratio, a low threshold voltage, a large contrast ratio and a long service life.

Means for Solving the Subject

The invention concerns a liquid crystal composition that has negative dielectric anisotropy and comprises at least one compound selected from the group consisting of compounds represented by formula (1) as a first component, and concerns a liquid crystal display device comprising this composition:

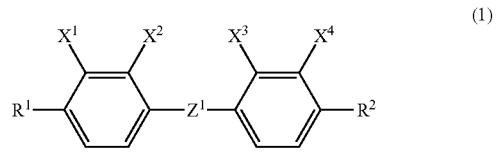

(1)

in formula (1), $R^1$ is alkyl having 1 to 12 carbons in which at least one hydrogen has been replaced by halogen; $R^2$ is alkyl having 1 to 12 carbons, alkoxy having 1 to 12 carbons, alkenyl having 2 to 12 carbons or alkenyloxy having 2 to 12 carbons; $X^1$ and $X^2$ are independently fluorine, chlorine or hydrogen; $X^3$ and $X^4$ are independently fluorine or chlorine; and $Z^1$ is a single bond, —CH$_2$CH$_2$—, —CH$_2$O—, —OCH$_2$—, —COO— or —OCO—.

Effect of the Invention

One of the advantages of the invention is to provide a liquid crystal composition that satisfies at least one of characteristics such as a high maximum temperature of a nematic phase, a low minimum temperature of a nematic phase, a small viscosity, a suitable optical anisotropy, a large negative dielectric anisotropy, a large specific resistance, a high stability to ultraviolet light and a high stability to heat. Another advantage is to provide a liquid crystal composition that is suitably balanced between at least two of the characteristics. A further advantage is to provide a liquid crystal display device comprising such a composition. A further advantage is to provide an AM device that has characteristics such as a short response time, a large voltage holding ratio, a low threshold voltage, a large contrast ratio and a long service life.

EMBODIMENT TO CARRY OUT THE INVENTION

The usage of the terms in the specification and claims is as follows. "Liquid crystal composition" and "liquid crystal display device" are sometimes abbreviated to "composition" and "device," respectively. "Liquid crystal display device" is a generic term for a liquid crystal display panel and a liquid crystal display module. "Liquid crystal compound" is a generic term for a compound having a liquid crystal phase such as a nematic phase or a smectic phase, and for a compound having no liquid crystal phases but being mixed to a composition for the purpose of adjusting the characteristics, such as the temperature range of a nematic phase, the viscosity and the dielectric anisotropy. This compound has a six-membered ring such as 1,4-cyclohexylene or 1,4-phenylene, and its molecular structure is rod-like. "Polymerizable compound" is a compound that is added to a composition in order to form a polymer in it. At least one compound selected from the group consisting of compounds represented by formula (1) is sometimes abbreviated to "compound (1)." "Compound (1)" means one compound, a mixture of two compounds or a mixture of three or more compounds represented by formula (1). This applies to a compound represented by another formula.

A liquid crystal composition is prepared by mixing a plurality of liquid crystal compounds. The ratio of a liquid crystal compound (content) is expressed as a percentage by weight (% by weight) based on the weight of this liquid crystal composition. An additive such as an optically active compound, an antioxidant, an ultraviolet light absorber, a coloring matter, an antifoaming agent, a polymerizable compound, a polymerization initiator and a polymerization inhibitor is added to this liquid crystal composition as required. The ratio of the additive (added amount) is expressed as a percentage by weight (% by weight) based on the weight of the liquid crystal composition in the same manner as with the liquid crystal compound. Weight parts per million (ppm) is sometimes used. The ratio of the polymerization initiator and the polymerization inhibitor is exceptionally expressed on the basis of the weight of the polymerizable compound.

"A higher limit of the temperature range of a nematic phase" is sometimes abbreviated to "the maximum temperature." "A lower limit of the temperature range of a nematic phase" is sometimes abbreviated to "the minimum temperature." That "specific resistance is large" means that a composition has a large specific resistance at a temperature close to the maximum temperature of a nematic phase as well as at room temperature in the initial stages, and that the composition has a large specific resistance at a temperature close to the maximum temperature of a nematic phase as well as at room temperature, after it has been used for a long time. That "a voltage holding ratio is large" means that a device has a large voltage holding ratio at a temperature close to the maximum temperature of a nematic phase as well as at room temperature in the initial stages, and that the device has a large voltage holding ratio at a temperature close to the maximum temperature of a nematic phase as well as at room temperature, after it has been used for a long time. The expression "increase the dielectric anisotropy" means that its value increases positively when the composition has positive dielectric anisotropy, and that its value increases negatively when the composition has negative dielectric anisotropy.

The expression "at least one 'A'" means that the number of 'A' is arbitrary. The expression "at least one 'A' may be replaced by 'B'" means that the position of 'A' is arbitrary when the number of 'A' is one, and the positions can also be selected without restriction when the number of 'A' is two or more. This rule also applies to the expression "at least one 'A' has been replaced by 'B'."

The symbol for the terminal group, $R^2$, is used for a plurality of compounds in the chemical formulas of component compounds. In these compounds, two groups represented by two arbitrary $R^2$ may be the same or different. In one case, for example, $R^2$ of compound (1) is ethyl and $R^2$ of compound (1-1) is ethyl. In another case, $R^2$ of compound (1) is ethyl and $R^2$ of compound (1-1) is propyl. The same rule applies to symbols such as $R^3$ and $P^4$. In formula (2), two of ring A are present when a is 2. In this compound, two groups represented by two of ring A may be the same or different. The same rule applies to arbitrary two of ring A, when a is greater than 2. The same rule also applies to symbols such as $Z^2$ and ring C. The same rule also applies to two -$Sp^2$-$P^5$ group in compound (4-27), for instance.

The symbol such as A, B or C surrounded by a hexagonal shape corresponds to a six-membered ring such as ring A, ring B or ring C, respectively. In compound (4), the hexagonal shape represents a six-membered ring or a condensed ring. An oblique line crossing a hexagonal shape means that arbitrary hydrogen on the ring may be replaced by a group such as -$Sp^1$-$P^1$. A subscript such as e shows the number of a group that has been replaced. There is no replacement when the subscript is 0 (zero).

2-Fluoro-1,4-phenylene means the two divalent groups described below. Fluorine may be facing left (L) or facing right (R) in a chemical formula. The same rule also applies to an asymmetric divalent group derived from a ring, such as tetrahydropyran-2,5-diyl.

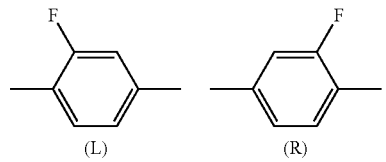

(L)    (R)

The invention includes the following items.
Item 1. A liquid crystal composition having negative dielectric anisotropy and comprising at least one compound selected from the group consisting of compounds represented by formula (1) as a first component:

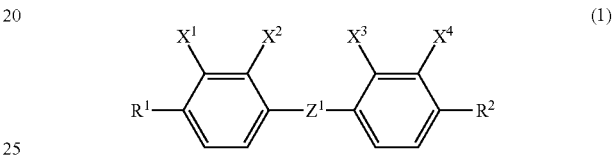

(1)

in formula (1), $R^1$ is alkyl having 1 to 12 carbons in which at least one hydrogen has been replaced by halogen; $R^2$ is alkyl having 1 to 12 carbons, alkoxy having 1 to 12 carbons, alkenyl having 2 to 12 carbons or alkenyloxy having 2 to 12 carbons; $X^1$ and $X^2$ are independently fluorine, chlorine or hydrogen; $X^3$ and $X^4$ are independently fluorine or chlorine; and $Z^1$ is a single bond, —$CH_2CH_2$—, —$CH_2O$—, —$OCH_2$—, —COO— or —OCO—.

Item 2. The liquid crystal composition according to item 1, the first component comprises at least one compound selected from the group consisting of compounds represented by formula (1-1):

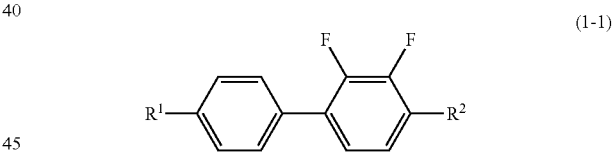

(1-1)

in formula (1-1), $R^1$ is alkyl having 1 to 12 carbons in which at least one hydrogen has been replaced by halogen; and $R^2$ is alkyl having 1 to 12 carbons, alkoxy having 1 to 12 carbons, alkenyl having 2 to 12 carbons or alkenyloxy having 2 to 12 carbons.

Item 3. The liquid crystal composition according to item 1 or 2, wherein the ratio of the first component is in the range of 3% by weight to 30% by weight based on the weight of the liquid crystal composition.

Item 4. The liquid crystal composition according to any one of items 1 to 3, further comprising at least one compound selected from the group consisting of compounds represented by formula (2) as a second component:

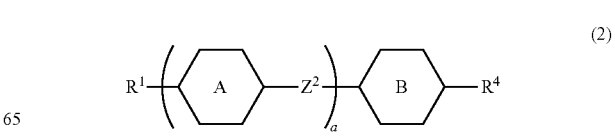

(2)

in formula (2), $R^3$ and $R^4$ are independently alkyl having 1 to 12 carbons, alkoxy having 1 to 12 carbons, alkenyl having 2 to 12 carbons, alkyl having 1 to 12 carbons in which at least one hydrogen has been replaced by fluorine or alkenyl having 2 to 12 carbons in which at least one hydrogen has been replaced by fluorine; ring A and ring B are independently 1,4-cyclohexylene, 1,4-phenylene, 2-fluoro-1,4-phenylene or 2,5-difluoro-1,4-phenylene; $Z^2$ is a single bond, —CH$_2$CH$_2$—, —CH$_2$O—, —OCH$_2$—, —COO— or —OCO—; and a is 1, 2 or 3.

Item 5. The liquid crystal composition according to any one of items 1 to 4, comprising at least one compound selected from the group consisting of compounds represented by formula (2-1) to formula (2-13) as a second component:

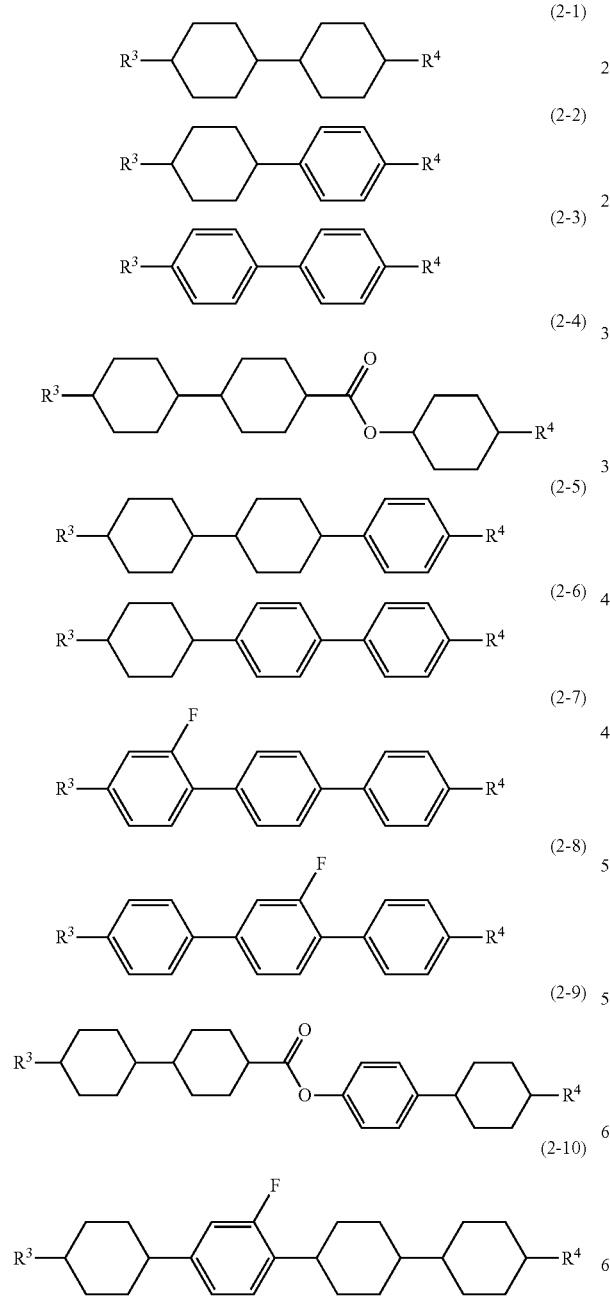

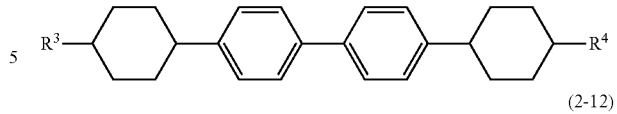

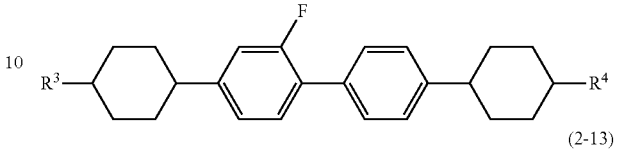

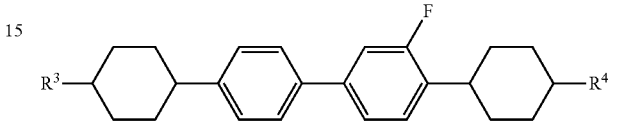

in formula (2-1) to formula (2-13), $R^3$ and $R^4$ are independently alkyl having 1 to 12 carbons, alkoxy having 1 to 12 carbons, alkenyl having 2 to 12 carbons, alkyl having 1 to 12 carbons in which at least one hydrogen has been replaced by fluorine or alkenyl having 2 to 12 carbons in which at least one hydrogen has been replaced by fluorine.

Item 6. The liquid crystal composition according to item 4 or 5, wherein the ratio of the second component is in the range of 10% by weight to 90% by weight based on the weight of the liquid crystal composition.

Item 7. The liquid crystal composition according to any one of items 1 to 6, comprising at least one compound selected from the group consisting of compounds represented by formula (3) as a third component:

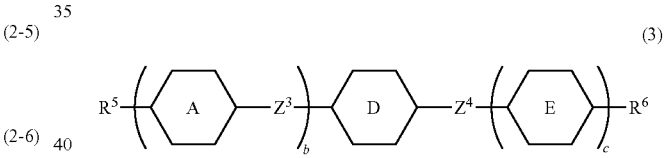

in formula (3), $R^5$ and $R^6$ are independently alkyl having 1 to 12 carbons, alkoxy having 1 to 12 carbons, alkenyl having 2 to 12 carbons or alkenyloxy having 2 to 12 carbons; ring C and ring E are independently 1,4-cyclohexylene, 1,4-cyclohexenylene, 1,4-phenylene, 1,4-phenylene in which at least one hydrogen has been replaced by fluorine or chlorine, or tetrahydropyran-2,5-diyl; ring D is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^3$ and $Z^4$ are independently a single bond, —CH$_2$CH$_2$—, —CH$_2$O—, —OCH$_2$—, —COO— or —OCO—; and b is 1, 2 or 3, c is 0 or 1, and the sum of b and c is 3 or less.

Item 8. The liquid crystal composition according to any one of items 1 to 7, comprising at least one compound selected from the group consisting of compounds represented by formula (3-1) to formula (3-19) as a third component:

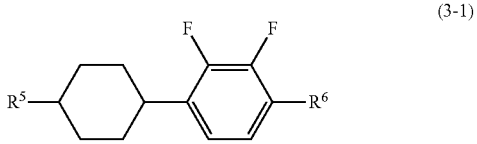

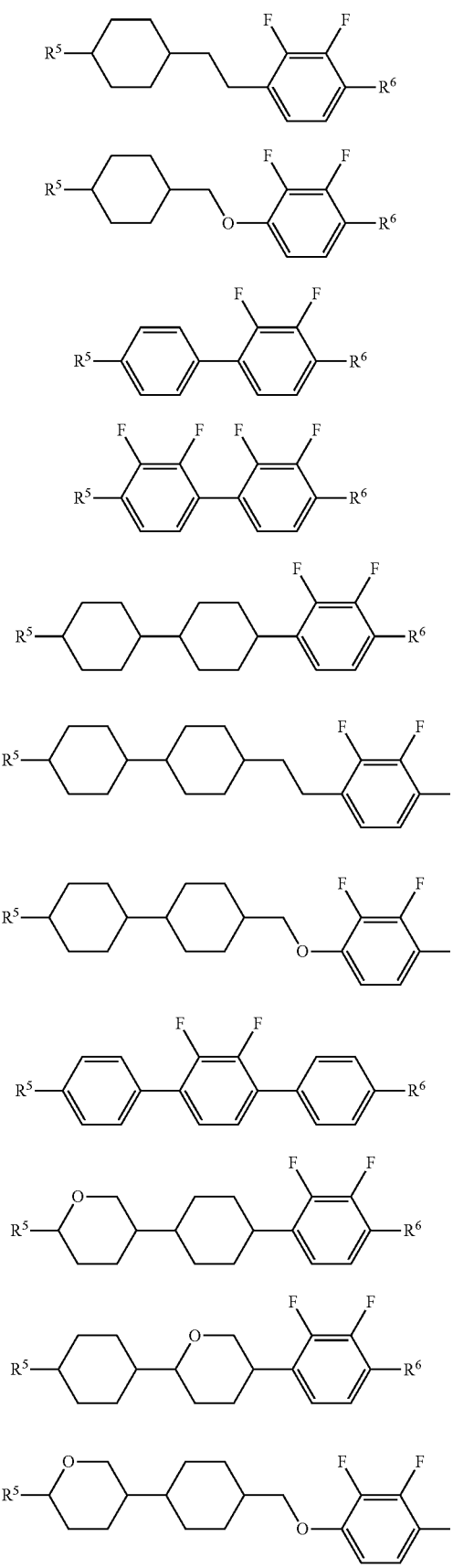
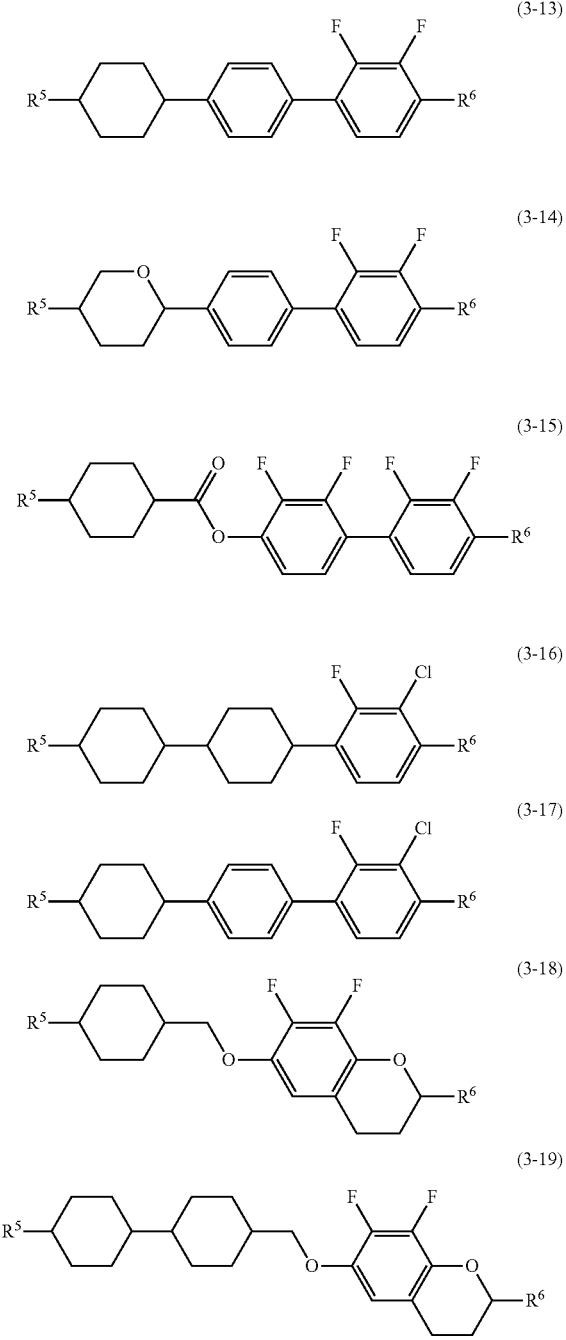

in formula (3-1) to formula (3-19), $R^5$ and $R^6$ are independently alkyl having 1 to 12 carbons, alkoxy having 1 to 12 carbons, alkenyl having 2 to 12 carbons or alkenyloxy having 2 to 12 carbons.

Item 9. The liquid crystal composition according to item 7 or 8, wherein the ratio of the third component is in the range of 10% by weight to 90% by weight based on the weight of the liquid crystal composition.

Item 10. The liquid crystal composition according to any one of items 1 to 9, comprising at least one polymerizable compound selected from the group consisting of compounds represented by (4) as an additive component:

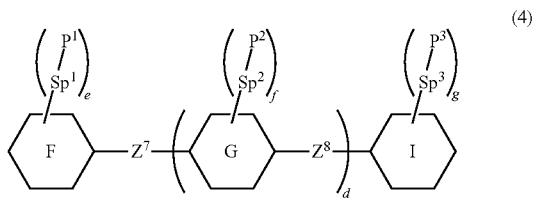

(4)

in formula (4), ring F and ring I are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in these rings at least one hydrogen may be replaced by halogen, alkyl having 1 to 12 carbons, alkoxy having 1 to 12 carbons or alkyl having 1 to 12 carbons in which at least one hydrogen has been replaced by halogen;

ring G is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in these rings at least one hydrogen may be replaced by halogen, alkyl having 1 to 12 carbons, alkoxy having 1 to 12 carbons or alkyl having 1 to 12 carbons in which at least one hydrogen has been replaced by halogen;

$Z^7$ and $Z^8$ are independently a single bond or alkylene having 1 to 10 carbons, and in the alkylene at least one —$CH_2$— may be replaced by —O—, —CO—, —COO— or —OCO—, and at least one —$CH_2$—$CH_2$— may be replaced by —CH=CH—, —C($CH_3$)=CH—, —CH=C($CH_3$)— or —O($CH_3$)=C($CH_3$)—, and in these groups at least one hydrogen may be replaced by fluorine or chlorine;

$P^1$, $P^2$ and $P^3$ are independently a polymerizable group;

$Sp^1$, $Sp^2$ and $Sp^3$ are independently a single bond or alkylene having 1 to 10 carbons, and in the alkylene at least one —$CH_2$— may be replaced by —O—, —COO—, —OCO— or —OCOO—, and at least one —$CH_2$—$CH_2$— may be replaced by —CH=CH— or —C≡C—, and in these groups at least one hydrogen may be replaced by fluorine or chlorine;

d is 0, 1 or 2; and e, f and g are independently 0, 1, 2, 3 or 4, and the sum of e, f and g is 1 or more.

Item 11. The liquid crystal composition according to item 10, wherein in formula (4) according to item 10, $P^1$, $P^2$ and $P^3$ are independently a polymerizable group selected from the group consisting of groups represented by formula (P-1) to formula (P-6):

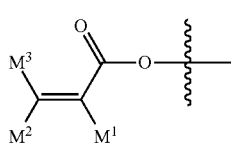

(P-1)

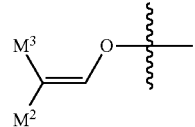

(P-2)

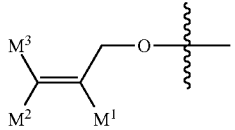

(P-3)

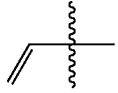

(P-4)

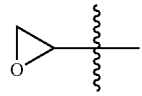

(P-5)

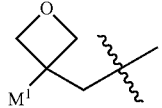

(P-6)

in formula (P-1) to formula (P-6), $M^1$, $M^2$ and $M^3$ are independently hydrogen, fluorine, alkyl having 1 to 5 carbons or alkyl having 1 to 5 carbons in which at least one hydrogen has been replaced by halogen; and at least one of $Sp^1$ and $Sp^3$ is alkylene in which at least one —$CH_2$— has been replaced by —O—, —COO—, —OCO— or —OCOO— when both $P^1$ and $P^3$ are a group represented by formula (P-4).

Item 12. The liquid crystal composition according to any one of items 1 to 11, comprising at least one polymerizable compound selected from the group consisting of compounds represented by formula (4-1) to formula (4-27) as an additive component:

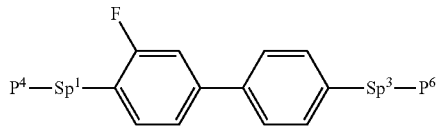

(4-1)

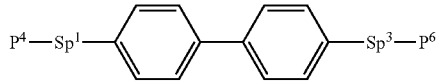

(4-2)

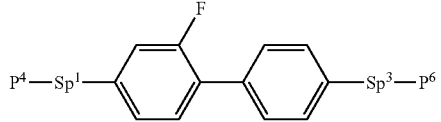

(4-3)

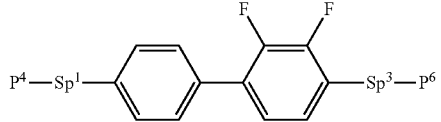

(4-4)

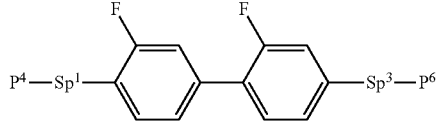

(4-5)

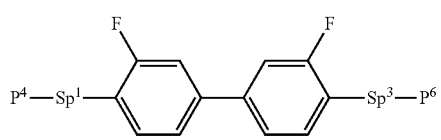
(4-6)
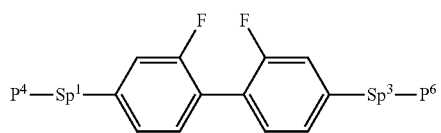
(4-7)
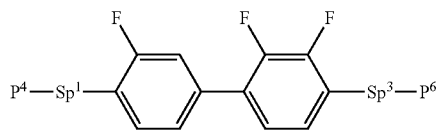
(4-8)
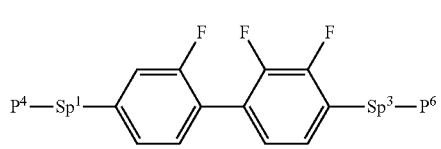
(4-9)
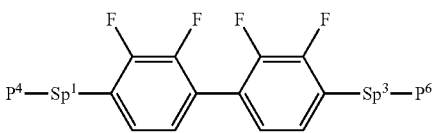
(4-10)
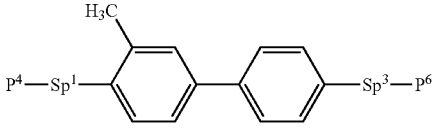
(4-11)
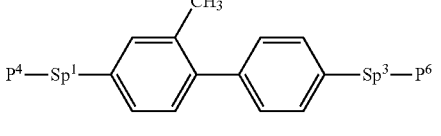
(4-12)
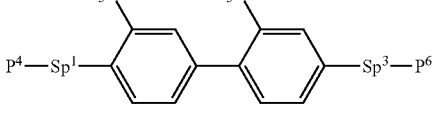
(4-13)
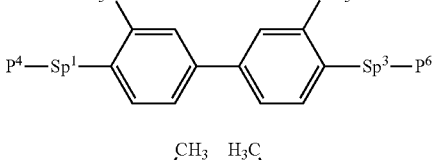
(4-14)
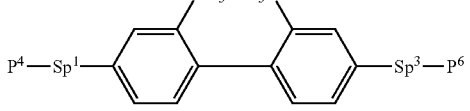
(4-15)
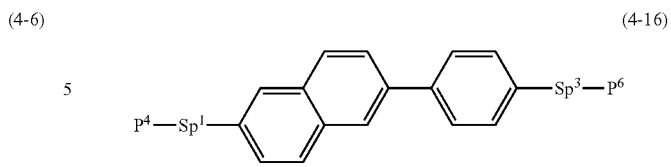
(4-16)
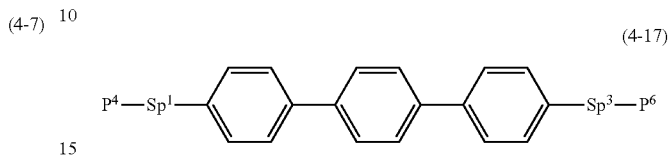
(4-17)
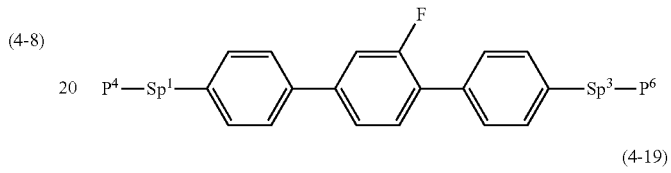
(4-18)
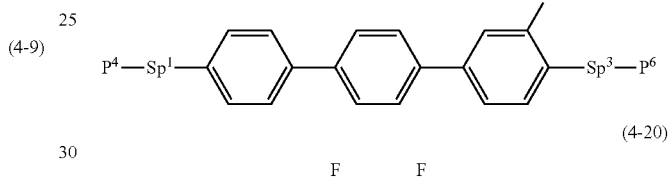
(4-19)
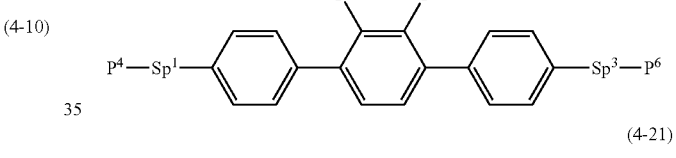
(4-20)
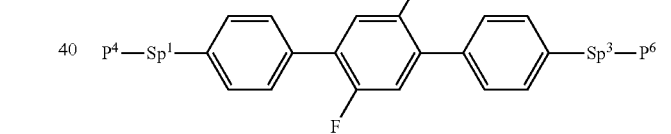
(4-21)
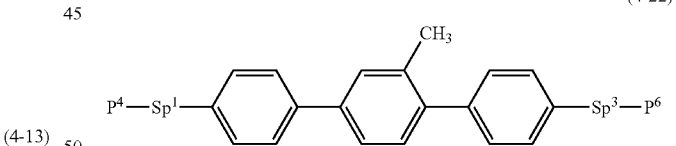
(4-22)
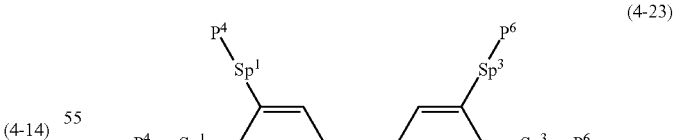
(4-23)
(4-24)
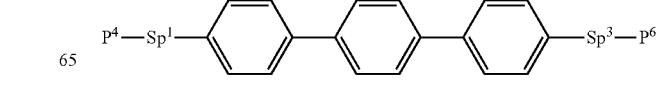

-continued (4-25)
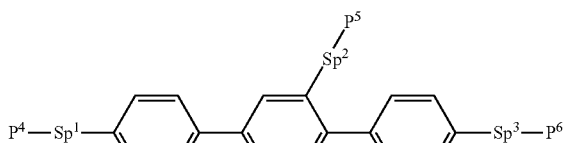

(4-26)
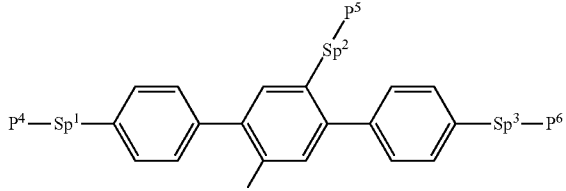

(4-27)
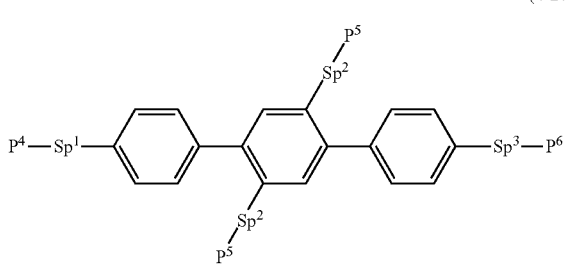

in formula (4-1) to formula (4-27), $P^4$, $P^5$ and $P^6$ are independently a polymerizable group selected from the group consisting of groups represented by formula (P-1) to formula (P-3);

(P-1)
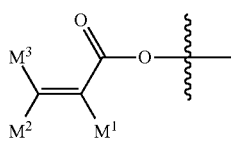

(P-2)
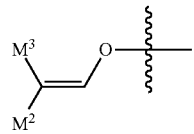

(P-3)
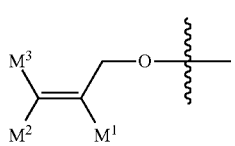

in formula (P-1) to formula (P-3), $M^1$, $M^2$ and $M^3$ are independently hydrogen, fluorine, alkyl having 1 to 5 carbons, or alkyl having 1 to 5 carbons in which at least one hydrogen has been replaced by halogen; and $Sp^1$, $Sp^2$ and $Sp^3$ are independently a single bond or alkylene having 1 to 10 carbons, and in the alkylene at least one —CH$_2$— may be replaced by —O—, —COO—, —OCO— or —OCOO—, and at least one —CH$_2$—CH$_2$— may be replaced by —CH=CH— or —C≡C—, and in these groups at least one hydrogen may be replaced by fluorine or chlorine.

Item 13. The liquid crystal composition according to any one of items 10 to 12, wherein the ratio of the additive component is in the range of 0.03% by weight to 10% by weight based on the weight of the liquid crystal composition.

Item 14. A compound represented by formula (1-1):

(1-1)
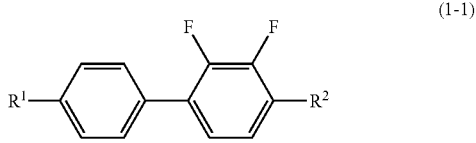

in formula (1-1), $R^1$ is alkyl having 1 to 12 carbons in which at least one hydrogen has been replaced by halogen; and $R^2$ is alkyl having 1 to 12 carbons, alkoxy having 1 to 12 carbons, alkenyl having 2 to 12 carbons or alkenyloxy having 2 to 12 carbons.

Item 15. A liquid crystal display device comprising the liquid crystal composition according to any one of items 1 to 13.

Item 16. The liquid crystal display device according to item 15, wherein the operating mode of the liquid crystal display device is an IPS mode, a VA mode, an FFS mode or an FPA mode, and the driving mode of the liquid crystal display device is an active matrix mode.

Item 17. A liquid crystal display device of a polymer sustained alignment type, comprising the liquid crystal composition according to any one of items 10 to 13, where the polymerizable compound in the liquid crystal composition has been polymerized.

Item 18. Use of the liquid crystal composition according to any one of items 1 to 13 for the liquid crystal display device.

Item 19. Use of the liquid crystal composition according to any one of items 10 to 13 for the liquid crystal display device of a polymer sustained alignment type.

The invention further includes the following items. (c) The composition described above, comprising at least one compound selected from the group consisting of compound (5) to compound (7), these of which are liquid crystal compounds having positive dielectric anisotropy disclosed in JP 2006-199941 A. (d) The composition described above, comprising polymerizable compound (4) described above. (e) The composition described above, comprising polymerizable compound that is different from polymerizable compound (4). (f) The composition described above, comprising at least one of additives such as an optically active compound, an antioxidant, an ultraviolet light absorber, a coloring matter, an antifoaming agent, a polymerizable compound, a polymerization initiator and a polymerization inhibitor. (g) An AM device comprising the composition described above. (h) A device comprising the composition described above and having a mode of TN, ECB, OCB, IPS, FFS, VA or FPA. (i) A transmission-type device comprising the composition described above. (j) Use of the composition described above, as a composition having a nematic phase. (k) Use of the composition prepared by the addition of an optically active compound to the composition described above, as an optically active composition.

The composition of the invention will be explained in the following order: First, the constitution of component compounds in the composition will be explained. Second, the main characteristics of the component compounds and the main effects of these compounds on the composition will be explained. Third, a combination of the components in the composition, a desirable ratio of the components and its basis will be explained. Fourth, a desirable embodiment of the component compounds will be explained. Fifth, desirable component compounds will be shown. Sixth, additives that may be added to the composition will be explained. Seventh, methods for synthesizing the component compounds will be explained. Last, the use of the composition will be explained.

First, the constitution of component compounds in the composition will be explained. The compositions of the invention are classified into composition A and composition B. Composition A may further comprise any other liquid crystal compound, an additive and so forth, in addition to compounds selected from compound (1), compound (2) and compound (3). "Any other liquid crystal compound" is a liquid crystal compound that is different from compound (1), compound (2) and compound (3). Such a compound is mixed with the composition for the purpose of further adjusting the characteristics. Of any other liquid crystal compound, a smaller amount of a cyano compound is desirable in view of its stability to heat or ultraviolet light. A more desirable ratio of the cyano compound is 0% by weight. The additive includes an optically active compound, an antioxidant, an ultraviolet light absorber, a coloring matter, an antifoaming agent, a polymerizable compound, a polymerization initiator and a polymerization inhibitor.

Composition B consists essentially of liquid crystal compounds selected from compound (1), compound (2) and compound (3). The term "essentially" means that the composition may comprise an additive, but does not comprise any other liquid crystal compound. Composition B has a smaller number of components than composition A. Composition B is preferable to composition A in view of cost reduction. Composition A is preferable to composition B in view of the fact that characteristics can be further adjusted by mixing with any other liquid crystal compound.

Second, the main characteristics of the component compounds and the main effects of these compounds on the characteristics of the composition will be explained. Table 2 summarizes the main characteristics of the component compounds based on the effects of the invention. In Table 2, the symbol L stands for "large" or "high", the symbol M stands for "medium", and the symbol S stands for "small" or "low." The symbols L, M and S mean a classification based on a qualitative comparison among the component compounds, and 0 (zero) means that the value is nearly zero.

TABLE 2

Characteristics of Compounds

| | Compounds | | |
|---|---|---|---|
| | Compound (1) | Compound (2) | Compound (3) |
| Maximum Temperature | S | S-L | S-L |
| Viscosity | S-M | S-M | M-L |
| Optical Anisotropy | M-L | S-L | M-L |
| Dielectric Anisotropy | M-L [1] | 0 | S-L [1] |
| Specific Resistance | L | L | L |

[1] Value of dielectric anisotropy is negative, and the symbol expresses the magnitude of the absolute value.

The main effects of the component compounds on the characteristics of the composition upon mixing the component compounds with the composition are as follows. Compound (1) maintains a high stability to ultraviolet light, or increases the dielectric anisotropy. Compound (2) decreases the viscosity, or increases the maximum temperature. Compound (3) increases the dielectric anisotropy, and decreases the minimum temperature. Compound (4) gives a polymer by polymerization, and this polymer decreases the response time of a device, and improve image burn-in.

Third, a combination of the components in the composition, a desirable ratio of the components and its basis will be explained. A combination of the components in the composition is the first and second components, the first, second and third components, the first, second and additive components, or the first, second, third and additive components. A desirable combination of the components is the first, second and third components or the first, second, third and additive components, where the additive component means a polymerizable compound (4).

A desirable ratio of the first component is approximately 3% by weight or more for increasing the dielectric anisotropy and maintaining a high stability to ultraviolet light, and approximately 30% by weight or less for decreasing the minimum temperature based on the weight of the liquid crystal composition. A more desirable ratio is in the range of approximately 5% by weight to approximately 20% by weight. An especially desirable ratio is in the range of approximately 5% by weight to approximately 15% by weight.

A desirable ratio of the second component is approximately 10% by weight or more for increasing the maximum temperature or decreasing the viscosity, and approximately 90% by weight or less for decreasing the minimum temperature based on the weight of the liquid crystal composition. A more desirable ratio is in the range of approximately 20% by weight to approximately 80% by weight. An especially desirable ratio is in the range of approximately 30% by weight to approximately 70% by weight.

A desirable ratio of the third component is approximately 10% by weight or more for increasing the dielectric anisotropy and approximately 90% by weight or less for decreasing the viscosity based on the weight of the liquid crystal composition. A more desirable ratio is in the range of approximately 20% by weight to approximately 80% by weight. An especially desirable ratio is in the range of approximately 30% by weight to approximately 70% by weight.

Compound (4) is added to the composition for the purpose of adjusting to device of a polymer sustained alignment type. A desirable ratio of the additive is approximately 0.03% by weight or more for orienting liquid crystal molecules, and approximately 10% by weight or less for preventing display defects of a device based on the weight of the liquid crystal composition. A more desirable ratio is in the range of approximately 0.1% by weight to approximately 2% by weight. An especially desirable ratio is in the range of approximately 0.2% by weight to approximately 1.0% by weight.

The characteristics of the composition, described in Table 1, can be adjusted by changing the ratio of the component compounds. The characteristics may be adjusted by mixing any other liquid crystal compound as requested. A composition in which the maximum temperature approximately 70° C. or more can be prepared in the same way. A composition in which the maximum temperature is approximately 75° C. or more can also be prepared. A composition in which the maximum temperature is approximately 80° C. or more can also be prepared. A composition in which the minimum temperature is approximately −10° C. or less can be prepared in the same way. A composition in which the minimum temperature is approximately −20° C. or less can also prepared. A composition in which the minimum temperature is approximately −30° C. or less can also be prepared.

A composition in which the optical anisotropy (measured at 25° C.) at a wavelength of 589 nanometers is in the range of approximately 0.09 to approximately 0.12 can be prepared in the same way. A composition in which the optical anisotropy is in the range of approximately 0.08 to approximately 0.16 can also be prepared. A composition in which the optical anisotropy is in the range of approximately 0.07 to approximately 0.20 can also be prepared. A composition in which the dielectric anisotropy (measured at 25° C.) at a frequency of 1 kHz is approximately −1.5 or less can be prepared in the same way. A composition in which the dielectric anisotropy is approximately −2 or less can also be prepared. A composition in which the dielectric anisotropy is approximately −2.5 or less can also be prepared.

Fourth, a desirable embodiment of the component compounds will be explained. In compound (1) to compound (3), desirable terminal groups are as follows. $R^1$ is alkyl having 1 to 12 carbons in which at least one hydrogen has been replaced by halogen. Halogen means fluorine, chlorine, bromine and iodine. Desirable halogen is fluorine and chlorine. More desirable halogen is fluorine. Desirable $R^1$ is alkyl having 1 to 12 carbons in which one or two hydrogens have been replaced by halogen for increasing the dielectric anisotropy. More desirable $R^1$ is

wherein h is an integer from 1 to 12. $R^2$, $R^5$ and $R^6$ are independently alkyl having 1 to 12 carbons, alkoxy having 1 to 12 carbons, alkenyl having 2 to 12 carbons or alkenyloxy having 2 to 12 carbons. Desirable $R^2$, $R^5$ or $R^6$ is alkyl having 1 to 12 carbons for increasing the stability, and alkoxy having 1 to 12 carbons for increasing the dielectric anisotropy. $R^3$ and $R^4$ are independently alkyl having 1 to 12 carbons, alkoxy having 1 to 12 carbons, alkenyl having 2 to 12 carbons, alkyl having 1 to 12 carbons in which at least one hydrogen has been replaced by fluorine or alkenyl having 2 to 12 carbons in which at least one hydrogen has been replaced by fluorine. Desirable $R^3$ or $R^4$ is alkenyl having 2 to 12 carbons for decreasing the viscosity, and alkyl having 1 to 12 carbons for increasing the stability.

Desirable alkyl is methyl, ethyl, propyl, butyl, pentyl, hexyl, heptyl or octyl. More desirable alkyl is ethyl, propyl, butyl, pentyl or heptyl for decreasing the viscosity.

Desirable alkoxy is methoxy, ethoxy, propoxy, butoxy, pentyloxy, hexyloxy or heptyloxy. More desirable alkoxy is methoxy or ethoxy for decreasing the viscosity.

Desirable alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. More desirable alkenyl is vinyl, 1-propenyl, 3-butenyl or 3-pentenyl for decreasing the viscosity. A desirable configuration of —CH=CH— in the alkenyl depends on the position of the double bond. Trans is preferable in the alkenyl such as 1-propenyl, 1-butenyl, 1-pentenyl, 1-hexenyl, 3-pentenyl and 3-hexenyl for decreasing the viscosity. C is preferable in the alkenyl such as 2-butenyl, 2-pentenyl and 2-hexenyl.

Desirable examples of alkyl in which at least one hydrogen has been replaced by fluorine are fluoromethyl, 2-fluoroethyl, 3-fluoropropyl, 4-fluorobutyl, 5-fluoropentyl, 6-fluorohexyl, 7-fluoroheptyl or 8-fluorooctyl. More desirable examples are 2-fluoroethyl, 3-fluoropropyl, 4-fluorobutyl or 5-fluoropentyl for increasing the dielectric anisotropy.

Desirable examples of alkenyl in which at least one hydrogen has been replaced by fluorine are 2,2-difluorovinyl, 3,3-difluoro-2-propenyl, 4,4-difluoro-3-butenyl, 5,5-difluoro-4-pentenyl or 6,6-difluoro-5-hexenyl. More desirable examples are 2,2-difluorovinyl or 4,4-difluoro-3-butenyl for decreasing the viscosity.

The alkyl is straight-chain or branched-chain, and does not include cycloalkyl. Straight-chain alkyl is preferable to branched-chain alkyl. This applies to alkoxy, alkenyl and so forth.

Ring A and ring B are independently 1,4-cyclohexylene, 1,4-phenylene, 2-fluoro-1,4-phenylene or 2,5-difluoro-1,4-phenylene. Desirable ring A or ring B is 1,4-cyclohexylene for decreasing the viscosity or for increasing the maximum temperature, and 1,4-phenylene for decreasing the minimum temperature.

Ring C and ring E are independently 1,4-cyclohexylene, 1,4-cyclohexenylene, 1,4-phenylene, 1,4-phenylene in which at least one hydrogen has been replaced by fluorine or chlorine, or tetrahydropyran-2,5-diyl. Desirable examples of "1,4-phenylene in which at least one hydrogen has been replaced by fluorine or chlorine" are 2-fluoro-1,4-phenylene, 2,3-difluoro-1,4-phenylene or 2-chloro-3-fluoro-1,4-phenylene. Desirable ring C or ring E is 1,4-cyclohexylene for decreasing the viscosity, and tetrahydropyran-2,5-diyl for increasing the dielectric anisotropy, and 1,4-phenylene for increasing the optical anisotropy. With regard to the configuration of 1,4-cyclohexylene, trans is preferable to cis for increasing the maximum temperature. Tetrahydropyran-2,5-diyl is

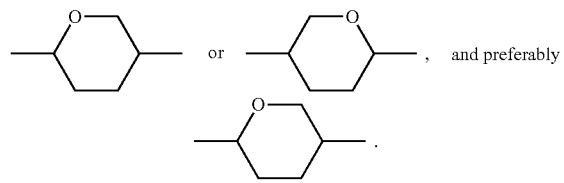

Ring D is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl. Desirable ring D is 2,3-difluoro-1,4-phenylene for decreasing the viscosity, and 2-chloro-3-fluoro-1,4-phenylene for decreasing the optical anisotropy, and 7,8-difluorochroman-2,6-diyl for increasing the dielectric anisotropy.

$X^1$ and $X^2$ are independently fluorine, chlorine or hydrogen. Desirable $X^1$ or $X^2$ is hydrogen for decreasing the viscosity. $X^3$ and $X^4$ are independently fluorine or chlorine. Desirable $X^3$ or $X^4$ is fluorine for increasing the dielectric anisotropy.

$Z^1$, $Z^2$, $Z^3$ and $Z^4$ are independently a single bond, —CH$_2$CH$_2$—, —CH$_2$O—, —OCH$_2$—, —COO— or —OCO—. Desirable $Z^1$, $Z^3$ or $Z^4$ is a single bond for decreasing the viscosity, and —CH$_2$CH$_2$— for decreasing the minimum temperature, and —CH$_2$O— or —OCH$_2$— for increasing the dielectric anisotropy. Desirable $Z^2$ is a single bond for decreasing the viscosity.

a is 1, 2 or 3. Desirable a is 1 for decreasing the viscosity, and is 2 or 3 for increasing the maximum temperature. b is 1, 2 or 3, c is 0 or 1, and the sum of b and c is 3 or less. Desirable b is 1 for decreasing the viscosity, and is 2 or 3 for increasing the maximum temperature. Desirable c is 0 for decreasing the viscosity, and is 1 for decreasing the minimum temperature.

In compound (4), $P^1$, $P^2$ and $P^3$ are independently a polymerizable group. Desirable $P^1$, $P^2$ or $P^3$ is a polymerizable group selected from the group consisting of groups represented by formula (P-1) to formula (P-6). More desirable $P^1$, $P^2$ or $P^3$ is group (P-1) or group (P-2). Especially desirable group (P-1) is —OCO—CH=CH$_2$ or —OCO—C(CH$_3$)=CH$_2$. A wavy line in group (P-1) to group (P-6) shows a binding site.

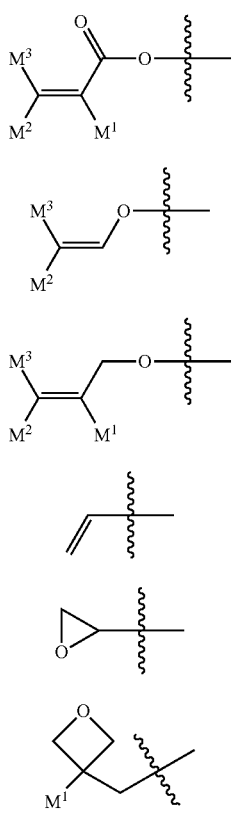

In group (P-1) to group (P-6), $M^1$, $M^2$ and $M^3$ are independently hydrogen, fluorine, alkyl having 1 to 5 carbons or alkyl having 1 to 5 carbons in which at least one hydrogen has been replaced by halogen. Desirable $M^1$, $M^2$ or $M^3$ is hydrogen or methyl for increasing the reactivity. More desirable $M^1$ is methyl, and more desirable $M^2$ or $M^3$ is hydrogen.

At least one of Sp$^1$ and Sp$^3$ is alkylene in which at least one —CH$_2$— has been replaced by —O—, —COO—, —OCO— or —OCOO—, when both $P^1$ and $P^3$ are group (P-4). That is to say, both $P^1$ and $P^3$ are not alkenyl such as 1-propenyl simultaneously.

Sp$^1$, Sp$^2$ and Sp$^3$ are independently a single bond or alkylene having 1 to 10 carbons, and in the alkylene at least one —CH$_2$— may be replaced by —O—, —COO—, —OCO— or —OCOO—, and at least one —CH$_2$—CH$_2$— may be replaced by —CH=CH— or —C≡C—, and in these groups at least one hydrogen may be replaced by fluorine or chlorine. Desirable Sp$^1$, Sp$^2$ or Sp$^3$ is a single bond.

Ring F and ring I are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in these rings at least one hydrogen may be replaced by halogen, alkyl having 1 to 12 carbons, alkoxy having 1 to 12 carbons or alkyl having 1 to 12 carbons in which at least one hydrogen has been replaced by halogen. Desirable ring F or ring I is phenyl. Ring G is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in these rings at least one hydrogen may be replaced by halogen, alkyl having 1 to 12 carbons, alkoxy having 1 to 12 carbons or alkyl having 1 to 12 carbons in which at least one hydrogen has been replaced by halogen. Especially desirable ring G is 1,4-phenylene or 2-fluoro-1,4-phenylene.

$Z^7$ and $Z^8$ are independently a single bond or alkylene having 1 to 10 carbons, and in the alkylene at least one —CH$_2$— may be replaced by —O—, —CO—, —COO— or —OCO—, and at least one —CH$_2$—CH$_2$— may be replaced by —CH=CH—, —C(CH$_3$)=CH—, —CH=C(CH$_3$)— or —C(CH$_3$)=C(CH$_3$)—, and in these groups at least one hydrogen may be replaced by fluorine or chlorine. Desirable $Z^7$ or $Z^8$ is a single bond, —CH$_2$CH$_2$—, —CH$_2$O—, —OCH$_2$—, —COO— or —OCO—. More desirable $Z^7$ or $Z^8$ is a single bond.

d is 0, 1 or 2. Desirable d is 0 or 1. e, f and g are independently 0, 1, 2, 3 or 4, and the sum of e, f and g is 1 or more. Desirable e, f or g is 1 or 2.

Fifth, desirable component compounds will be shown. Desirable compound (1) is compound (1-1) described above.

Desirable compound (2) is compound (2-1) to compound (2-13) described in item 5. It is desirable that in these compounds, at least one of the second component should be compound (2-1), compound (2-3), compound (2-5), compound (2-6), compound (2-7) or compound (2-8). It is desirable that at least two of the second component should be a combination of compound (2-1) and compound (2-3), compound (2-1) and compound (2-5) or compound (2-1) and compound (2-6).

Desirable compound (3) is compound (3-1) to compound (3-19) described in item 8. It is desirable that in these compounds, at least one of the third component should be compound (3-1), compound (3-3), compound (3-4), compound (3-6), compound (3-8) or compound (3-13). It is desirable that at least two of the third component should be a combination of compound (3-1) and compound (3-6), compound (3-1) and compound (3-13), compound (3-3) and compound (3-6), compound (3-3) and compound (3-13) or compound (3-4) and compound (3-8).

Desirable compound (4) is compound (4-1) to compound (4-27) described in item 12. It is desirable that in these compounds, at least one additive component should be compound (4-1), compound (4-2), compound (4-24), compound (4-25), compound (4-26) or compound (4-27). It is desirable that at least two of additive component should be a combination of compound (4-1) and compound (4-2), compound (4-1) and compound (4-18), compound (4-2) and compound (4-24), compound (4-2) and compound (4-25), compound (4-2) and compound (4-26), compound (4-25) and compound (4-26) or compound (4-18) and compound (4-24). In group (P-1) to (P-3), desirable $M^1$, $M^2$ or $M^3$ is hydrogen or methyl. Desirable Sp$^1$, Sp$^2$ or Sp$^a$ is a single bond, —CH$_2$CH$_2$—, —CH$_2$O—, —OCH$_2$—, —COO—, —OCO—, —CO—CH=CH— or —CH=CH—CO—.

Sixth, additives that may be added to the composition will be explained. Such additives include an optically active compound, an antioxidant, an ultraviolet light absorber, a coloring matter, an antifoaming agent, a polymerizable compound, a polymerization initiator and a polymerization inhibitor. The optically active compound is added to the composition for the purpose of inducing the helical structure of liquid crystal molecules and giving a twist angle. Examples of such compounds include compound (5-1) to compound (5-5). A desirable ratio of the optically active compound is approximately 5% by weight or less, and a more desirable ratio is in the range of approximately 0.01% by weight to approximately 2% by weight.

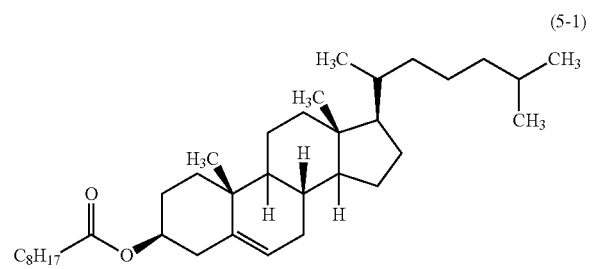

The antioxidant is added to the composition in order to prevent a decrease in specific resistance that is caused by heating under air, or to maintain a large voltage holding ratio at a temperature close to the maximum temperature of a nematic phase as well as at room temperature, after the device has been used for a long time.

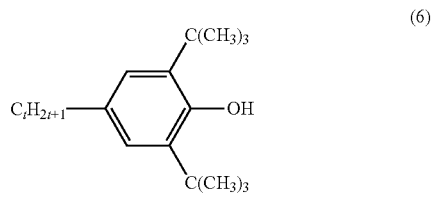

A desirable example of the antioxidant is compound (6) where t is an integer from 1 to 9, for instance. In compound (6), desirable t is 1, 3, 5, 7 or 9. More desirable t is 7. Compound (6) where t is 7 is effective in maintaining a large voltage holding ratio at a temperature close to the maximum temperature of a nematic phase as well as at room temperature, after the device has been used for a long time, since it has a small volatility. A desirable ratio of the antioxidant is approximately 50 ppm or more for achieving its effect and is approximately 600 ppm or less for avoiding a decrease in the maximum temperature or avoiding an increase in the minimum temperature. A more desirable ratio is in the range of approximately 100 ppm to approximately 300 ppm.

Desirable examples of the ultraviolet light absorber include benzophenone derivatives, benzoate derivatives and triazole derivatives. A light stabilizer such as an amine having steric hindrance is also desirable. A desirable ratio of the ultraviolet light absorber or the light stabilizer is approximately 50 ppm or more for achieving its effect and is approximately 10,000 ppm or less for avoiding a decrease in the maximum temperature or avoiding an increase in the minimum temperature. A more desirable ratio is in the range of approximately 100 ppm to approximately 10,000 ppm.

A dichroic dye such as an azo dye or an anthraquinone dye is added to the composition for adjusting to a device having a guest host (GH) mode. A desirable ratio of the coloring matter is in the range of approximately 0.01% by weight to approximately 10% by weight. The antifoaming agent such as dimethyl silicone oil or methyl phenyl silicone oil is added to the composition for preventing foam formation. A desirable ratio of the antifoaming agent is approximately 1 ppm or more for achieving its effect and is approximately 1,000 ppm or less for avoiding a poor display. A more desirable ratio is in the range of approximately 1 ppm to approximately 500 ppm.

The polymerizable compound is used for adjusting to a device with a PSA (polymer sustained alignment) mode. Compound (4) is suitable for this purpose. A polymerizable compound that is different from compound (4) may be added to the composition, together with compound (4). Desirable examples of such a polymerizable compound include compounds having a polymerizable group, such as acrylates, methacrylates, vinyl compounds, vinyloxy compounds, propenyl ethers, epoxy compounds (oxiranes, oxetanes) and vinyl ketones. More desirable examples are acrylate derivatives or methacrylate derivatives. A desirable ratio of compound (4) is in the range of 10% by weight or more based on the total weight of the polymerizable compound. A more desirable ratio is 50% by weight or more. An especially desirable ratio is 80% by weight or more. An especially desirable ratio is also 100% by weight.

A polymerizable compound such as compound (4) is polymerized on irradiation with ultraviolet light. It may be polymerized in the presence of a initiator such as a photopolymerization initiator. Suitable conditions for polymerization, and a suitable type and amount of the initiator are known to a person skilled in the art, and are described in the literature. For example, Irgacure 651 (registered trademark; BASF), Irgacure 184 (registered trademark; BASF) or Darocure 1173 (registered trademark; BASF), each of which is a photoinitiator, is suitable for radical polymerization. A desirable ratio of the photopolymerization initiator is in the range of approximately 0.1% by weight to approximately 5% by weight based on the weight of the polymerizable compound. A more desirable ratio is in the range of approximately 1% by weight to approximately 3% by weight.

The polymerization inhibitor may be added in order to prevent the polymerization when a polymerizable compound such as compound (4) is kept in storage. The polymerizable compound is usually added to the composition without removing the polymerization inhibitor. Examples of the polymerization inhibitor include hydroquinone derivatives such as hydroquinone and methylhydroquinone, 4-tert-butylcatechol, 4-methoxyphenol and phenothiazine.

Seventh, methods for synthesizing the component compounds will be explained. These compounds can be synthesized by known methods. The synthetic methods will be exemplified.

Compound (2-1) and compound (2-5) are prepared by the method described in JP S59-176221 A (1984). Compound (3-1) is prepared by the method described in JP 2000-053602 A. Compound (4) is prepared by reference to JP 2012-001526 A and WO 2010-131600 A. Compound (4-18) is prepared by the method described in JP H07-101900 A (1995). An antioxidant is commercially available. The compound of formula (6) where t is 1 is available from Sigma-Aldrich Corporation. Compound (6) where t is 7, for instance, is synthesized according to the method described in U.S. Pat. No. 3,660,505.

Compounds whose synthetic methods are not described can be prepared according to the methods described in books such as "Organic Syntheses" (John Wiley & Sons, Inc.), "Organic Reactions" (John Wiley & Sons, Inc.), "Comprehensive Organic Synthesis" (Pergamon Press), and "Shin-Jikken Kagaku Kouza" (New experimental Chemistry Course, in English; Maruzen Co., Ltd., Japan). The composition is prepared according to known methods using the compounds thus obtained. For example, the component compounds are mixed and dissolved in each other by heating.

Last, the use of the composition will be explained. The composition of the invention mainly has a minimum temperature of approximately −10° C. or lower, a maximum temperature of approximately 70° C. or higher, and an optical anisotropy in the range of approximately 0.07 to approximately 0.20. This composition is suitable especially for an AM device having a transmission type. A composition having an optical anisotropy in the range of approximately 0.08 to approximately 0.25 may be prepared by adjusting the ratio of the component compounds or by mixing with any other liquid crystal compound. Furthermore, a composition having an optical anisotropy in the range of approximately 0.10 to approximately 0.30 may be prepared by this method. A device comprising this composition has a large voltage holding ratio. This composition is suitable for an AM device. This composition can be used as a composition having a nematic phase and as an optically active composition by adding an optically active compound.

The composition can be used for an AM device. It can also be used for a PM device. The composition can also be used for the AM device and the PM device having a mode such as PC, TN, STN, ECB, OCB, IPS, FFS, VA and FPA. It is especially desirable to use the composition for the AM device having a mode of TN, OCB, IPS or FFS. In the AM device having the IPS or FFS mode, the orientation of liquid crystal molecules may be parallel or perpendicular to a glass substrate, when no voltage is applied. These devices may be of a reflection type, a transmission type or a semi-transmission type. It is desirable to use the composition for a device having the transmission type. The composition can be used for an amorphous silicon-TFT device or a polycrystal silicon-TFT device. The composition is also usable for an NCAP (nematic curvilinear aligned phase) device prepared by microcapsulating the composition, and for a PD (polymer dispersed) device in which a three-dimensional network-polymer is formed in the composition.

One example of methods for producing the device of a polymer sustained alignment type is as follows: A device having two substrates called an array substrate and a color filter substrate is prepared. At least one of the substrates has an electrode layer. Liquid crystal compounds are mixed to give a liquid crystal composition. A polymerizable compound is added to this composition. An additive may be further added as required. The composition is poured into the device. The device is irradiated with light under the conditions of an applied voltage. Ultraviolet light is preferable. The polymerizable compound is polymerized by irradiation with light. A composition comprising a polymer is formed by the polymerization. The device of polymer sustained alignment type can be produced by this procedure.

In the procedure, liquid crystal molecules are oriented by the effect of an electric field when a voltage is applied. The molecules of the polymerizable compound are also oriented according to the orientation. A polymer where the orientation is maintained is formed since the polymerizable compound is polymerized by ultraviolet light under these conditions. The response time of the device is decreased by the effect of the polymer. Image burn-in can also be improved at the same time by the effect of the polymer, since the burn-in is a malfunction of liquid crystal molecules. Incidentally, it may be possible that the polymerizable compound in the composition is polymerized in advance and then this composition is placed between the substrates of a liquid crystal display device.

EXAMPLES

The invention will be explained in more detail by way of examples. The invention is not limited to the examples. The invention includes a mixture of the composition in Example M1 and the composition in Example M2. The invention also includes a mixture prepared by mixing at least two compositions in Examples. Compounds prepared herein were identified by methods such as NMR analysis. The characteristics of the compounds, compositions and devices were measured by the methods described below.

NMR Analysis

A model DRX-500 apparatus made by Bruker BioSpin Corporation was used for measurement. In the measurement of $^1$H-NMR, a sample was dissolved in a deuterated solvent such as $CDCl_3$, and the measurement was carried out under the conditions of room temperature, 500 MHz and the accumulation of 16 scans. Tetramethylsilane was used as an internal standard. In the measurement of $^{19}$F-NMR, $CFCl_3$ was used as the internal standard, and 24 scans were accumulated. In the explanation of the nuclear magnetic resonance spectra, the symbols s, d, t, q, quin, sex, m and br stand for a singlet, a doublet, a triplet, a quartet, a quintet, a sextet, a multiplet and line-broadening, respectively.

Gas Chromatographic Analysis:

A gas chromatograph Model GC-14B made by Shimadzu Corporation was used for measurement. The carrier gas was helium (2 milliliters per minute). The sample injector and the detector (FID) were set to 280° C. and 300° C., respectively. A capillary column DB-1 (length 30 meters, bore 0.32 millimeter, film thickness 0.25 micrometers, dimethylpolysiloxane as the stationary phase, non-polar) made by Agilent Technologies, Inc. was used for the separation of component compounds. After the column had been kept at 200° C. for 2 minutes, it was further heated to 280° C. at the rate of 5° C. per minute. A sample was dissolved in acetone (0.1% by weight), and 1 microliter of the solution was injected into the sample injector. A recorder used was Model C-R5A Chromatopac Integrator made by Shimadzu Corporation or its equivalent. The resulting gas chromatogram showed the retention time of peaks and the peak areas corresponding to the component compounds.

Solvents for diluting the sample may also be chloroform, hexane and so forth. The following capillary columns may also be used in order to separate the component compounds: HP-1 made by Agilent Technologies Inc. (length 30 meters, bore 0.32 millimeter, film thickness 0.25 micrometers), Rtx-1 made by Restek Corporation (length 30 meters, bore 0.32 millimeter, film thickness 0.25 micrometers), and BP-1 made by SGE International Pty. Ltd. (length 30 meters, bore 0.32 millimeter, film thickness 0.25 micrometers). A capillary column CBP1-M50-025 (length 50 meters, bore 0.25 millimeter, film thickness 0.25 micrometers) made by Shimadzu Corporation may also be used for the purpose of avoiding an overlap of peaks of the compounds.

The ratio of the liquid crystal compounds comprised in the composition may be calculated according to the following method. A mixture of the liquid crystal compounds are detected by use of a gas chromatograph (FID). The ratio of peak areas in the gas chromatogram corresponds to the ratio (ratio by weight) of the liquid crystal compounds. When the capillary columns described above are used, the correction coefficient of respective liquid crystal compounds may be regarded as 1 (one). Accordingly, the ratio (percentage by weight) of the liquid crystal compounds can be calculated from the ratio of peak areas.

Samples for Measurement

A composition itself was used as a sample when the characteristics of the composition were measured. When the characteristics of a compound were measured, a sample for measurement was prepared by mixing this compound (15% by weight) with mother liquid crystals (85% by weight). The characteristic values of the compound were calculated from the values obtained from measurements by an extrapolation method: (Extrapolated value)=(Measured value of sample)−0.85×(Measured value of mother liquid crystals)/0.15. When a smectic phase (or crystals) deposited at 25° C. at this ratio, the ratio of the compound to the mother liquid crystals was changed in the order of (10% by weight:90% by weight), (5% by weight: 95% by weight) and (1% by weight:99% by weight). The values of the maximum temperature, the optical anisotropy, the viscosity and the dielectric anisotropy regarding the compound were obtained by means of this extrapolation method.

The mother liquid crystals described below were used. The ratio of the component compounds were expressed as a percentage by weight.

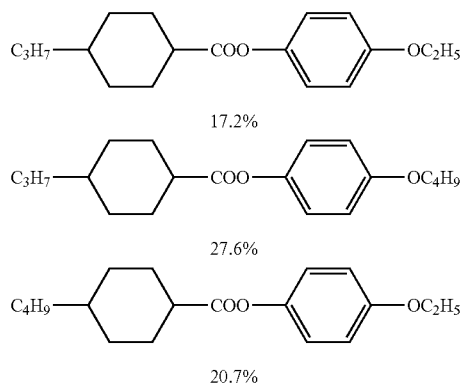

Measurement Methods

The characteristics of compounds were measured according to the following methods. Most are methods described in the JEITA standards (JEITA-ED-2521B) which was deliberated and established by Japan Electronics and Information Technology Industries Association (abbreviated to JEITA), or the modified methods. No thin film transistors (TFT) were attached to a TN device used for measurement.

(1) Maximum Temperature of a Nematic Phase (NI; ° C.):

A sample was placed on a hot plate in a melting point apparatus equipped with a polarizing microscope and was heated at the rate of 1° C. per minute. The temperature was measured when part of the sample began to change from a nematic phase to an isotropic liquid. A higher limit of the temperature range of a nematic phase may be abbreviated to the "maximum temperature."

(2) Minimum Temperature of a Nematic Phase (Tc; ° C.):

A sample having a nematic phase was placed in glass vials and then kept in freezers at temperatures of 0° C., −10° C., −20° C., −30° C. and −40° C. for 10 days, and then the liquid crystal phases were observed. For example, when the sample maintained the nematic phase at −20° C. and changed to crystals or a smectic phase at −30° C., Tc was expressed as <−20° C. A lower limit of the temperature range of a nematic phase may be abbreviated to "the minimum temperature."

(3) Viscosity (Bulk Viscosity; η; Measured at 20° C.; mPa·s):

An E-type viscometer made by Tokyo Keiki Inc. was used for measurement.

(4) Viscosity (Rotational Viscosity; γ1; Measured at 25° C.; mPa·s):

The measurement was carried out according to the method described in M. Imai, et al., Molecular Crystals and Liquid Crystals, Vol. 259, p. 37 (1995). A sample was poured into a VA device in which the distance between the two glass substrates (cell gap) was 20 micrometers. A voltage in the range of 39 V to 50 V was applied stepwise with an increment of 1 volt to this device. After a period of 0.2 second with no voltage, a voltage was applied repeatedly under the conditions of only one rectangular wave (rectangular pulse; 0.2 second) and no voltage (2 seconds). The peak current and the peak time of the transient current generated by the applied voltage were measured. The value of rotational viscosity was obtained from these measured values and the calculating equation (8) on page 40 of the paper presented by M. Imai, et al. The value of the dielectric anisotropy necessary for the present calculation was measured according to item (6).

(5) Optical Anisotropy (Refractive Index Anisotropy; Δn; Measured at 25° C.):

The measurement was carried out using an Abbe refractometer with a polarizing plate attached to the ocular, using light at a wavelength of 589 nanometers. The surface of the main prism was rubbed in one direction, and then a sample was placed on the main prism. The refractive index (n∥) was measured when the direction of the polarized light was parallel to that of rubbing. The refractive index (n⊥) was measured when the direction of polarized light was perpendicular to that of rubbing. The value of the optical anisotropy (Δn) was calculated from the equation: Δn=n∥−n⊥.

(6) Dielectric Anisotropy (Δ∈; Measured at 25° C.):

The value of dielectric anisotropy was calculated from the equation: Δ∈=∈∥−∈⊥. Dielectric constants (∈∥ and ∈⊥) were measured as follows.

1) Measurement of a dielectric constant (∈∥): A solution of octadecyltriethoxysilane (0.16 mL) in ethanol (20 mL) was applied to thoroughly cleaned glass substrates. The glass substrates were rotated with a spinner, and then heated at 150° C. for one hour. A sample was poured into a VA device in which the distance between the two glass substrates (cell gap) was 4 micrometers, and then this device was sealed with a UV-curable adhesive. Sine waves (0.5 V, 1 kHz) were applied to this device, and the dielectric constant (∈∥) in the major axis direction of liquid crystal molecules was measured after 2 seconds.

2) Measurement of a dielectric constant (∈⊥): A polyimide solution was applied to thoroughly cleaned glass substrates. The glass substrates were calcined, and then the resulting alignment film was subjected to rubbing. A sample was poured into a TN device in which the distance between the two glass substrates (cell gap) was 9 micrometers and the twist angle was 80 degrees. Sine waves (0.5 V, 1 kHz) were applied to this device, and the dielectric constant (∈⊥) in the minor axis direction of liquid crystal molecules was measured after 2 seconds.

(7) Threshold Voltage (Vth; Measured at 25° C.; V):

The measurement was carried out with an LCD evaluation system Model LCD-5100 made by Otsuka Electronics Co., Ltd. The light source was a halogen lamp. A sample was poured into a PVA device having a normally black mode, in which the distance between the two glass substrates (cell gap) was 4 micrometers and the rubbing direction was antiparallel, and then this device was sealed with a UV-curable adhesive. The voltage to be applied to this device (60 Hz, rectangular waves) was stepwise increased in 0.02 V increments from 0 V up to 20 V. During the increase, the device was vertically irradiated with light, and the amount of light passing through the device was measured. A voltage-transmittance curve was prepared, in which the maximum amount of light corresponded to 100% transmittance and the minimum amount of light corresponded to 0% transmittance. The threshold voltage was voltage at 10% transmittance.

(8) Voltage Holding Ratio (VHR-1a; Measured at 25° C.; %):

A TN device used for measurement had a polyimide-alignment film, and the distance between the two glass substrates (cell gap) was 5 micrometers. A sample was poured into the device, and then this device was sealed with a UV-curable adhesive. A pulse voltage (60 microseconds at 5 V) was applied to this device and the device was charged. A decreasing voltage was measured for 166.7 milliseconds with a high-speed voltmeter, and area A between the voltage curve and the horizontal axis in a unit cycle was obtained. Area B was an area without the decrease. The voltage holding ratio was expressed as a percentage of area A to area B.

(9) Voltage Holding Ratio (VHR-2a; Measured at 60° C.; %):

The voltage holding ratio was measured by the method described above, except that it was measured at 60° C. instead of 25° C. The resulting values were represented by the symbol VHR-2a. In a composition comprising a polymerizable compound, the TN device was irradiated with ultraviolet light of 25 mW/cm$^2$ for 400 seconds while a voltage of 15 V was applied, and the compound was polymerized. A mercury-xenon lamp, Model Execure 4000-D, made by Hoya Candeo Optronics Corp. was used for irradiation with ultraviolet light.

(10) Voltage Holding Ratio (VHR-3a; Measured at 60° C.; %):

The stability to ultraviolet light was evaluated by measuring a voltage holding ratio after irradiation with ultraviolet light. A TN device used for measurement had a polyimide-alignment film and the cell gap was 5 micrometers. A sample was poured into this device, and then the device was irradiated with light for 167 minutes. The light source was a black light (peak wavelength, 369 nm), and the distance between the device and the light source was 5 millimeters. In the measurement of VHR-3a, a decreasing voltage was measured for 166.7 milliseconds. In a composition comprising a polymerizable compound, it was polymerized under the conditions described in item (9). A composition having a large VHR-3a has a large stability to ultraviolet light.

(11) Voltage Holding Ratio (VHR-4-a; Measured at 25° C.; %):

A TN device into which a sample was poured was heated in a constant-temperature bath at 80° C. for 500 hours, and then the stability to heat was evaluated by measuring the voltage holding ratio. In the measurement of VHR-4-a, a decreasing voltage was measured for 166.7 milliseconds. A composition having a large VHR-4-a has a high stability to heat.

(12) Response Time (τ; Measured at 25° C.; Millisecond):

An LCD evaluation system Model LCD-5100 made by Otsuka Electronics Co., Ltd. was used for measurement. The light source was a halogen lamp. The low-pass filter was set at 5 kHz.

1) A composition in which a polymerizable compound is not comprised: A sample was poured into a VA device having a normally black mode, in which the cell gap between the two glass substrates was 4 micrometers, and the rubbing direction was antiparallel. This device was sealed with a UV-curable adhesive. Rectangular waves (60 Hz, 10 V, 0.5 second) were applied to this device. The device was vertically irradiated with light simultaneously, and the amount of light passing through the device was measured. The transmittance was regarded as 100% when the amount of light reached a maximum. The transmittance was regarded as 0% when the amount of light reached a minimum. The response time was expressed as the period of time required for the change from 90% to 10% transmittance (fall time: millisecond).

2) A composition comprising a polymerizable compound: A sample was poured into a PVA device having a normally black mode, in which the cell gap between the two glass substrates was 3.2 micrometers, and the rubbing direction was antiparallel. This device was sealed with a UV-curable adhesive. The device was irradiated with ultraviolet light of 25 mW/cm$^2$ for 400 seconds while a voltage of 15 V was applied, and the compound was polymerized. A mercury-xenon lamp, Model Execure 4000-D, made by Hoya Candeo Optronics Corp. was used for irradiation with ultraviolet light. Rectangular waves (60 Hz, 10 V, 0.5 second) were applied to this device. The device was vertically irradiated with light simultaneously, and the amount of light passing through the device was measured. The transmittance was regarded as 100% when the amount of light reached a maximum. The transmittance was regarded as 0% when the amount of light reached a minimum. The response time was expressed as the period of time required for the change from 0% to 90% transmittance (rise time: millisecond).

(13) Specific Resistance (ρ; Measured at 25° C.; Ωcm):

A sample of 1.0 milliliter was poured into a vessel equipped with electrodes. A DC voltage (10 V) was applied to the vessel, and the DC current was measured after 10 seconds. The specific resistance was calculated from the following equation: (specific resistance)=[(voltage)×(electric capacity of vessel)]/[(DC current)×(dielectric constant in vacuum)].

The compounds described in Examples were expressed in terms of symbols according to the definition in Table 3 described below. In Table 3, the configuration of 1,4-cyclohexylene is trans. The parenthesized number next to a symbolized compound in Example corresponds the number of the compound. The symbol (-) means any other liquid crystal compound. The ratio (percentage) of a liquid crystal compound means the percentages by weight (% by weight) based on the liquid crystal composition. Last, the values of characteristics of the composition are summarized.

TABLE 3

Method of Description of Compounds using Symbols
R—(A$_1$)—Z$_1$— . . . —Z$_n$—(A$_n$)—R'

| 1) Left-terminal Group R— | Symbol |
|---|---|
| F—C$_n$H$_{2n}$— | Fn— |
| C$_n$H$_{2n+1}$— | n- |
| C$_n$H$_{2n+1}$O— | nO— |
| C$_m$H$_{2m+1}$OC$_n$H$_{2n}$— | mOn— |
| CH$_2$=CH— | V— |
| C$_n$H$_{2n+1}$—CH=CH— | nV— |
| CH$_2$=CH—C$_n$H$_{2n}$— | Vn— |
| C$_m$H$_{2m+1}$—CH=CH—C$_n$H$_{2n}$— | mVn— |
| CF$_2$=CH— | VFF— |
| CF$_2$=CH—C$_n$H$_{2n}$— | VFFn— |
| CH$_2$=CH—COO— | AC— |
| CH$_2$=C(CH$_3$)—COO— | MAC— |

| 2) Right-terminal Group —R' | Symbol |
|---|---|
| —C$_n$H$_{2n+1}$ | -n |
| —OC$_n$H$_{2n+1}$ | —On |
| —CH=CH$_2$ | —V |
| —CH=CH—C$_n$H$_{2n+1}$ | —Vn |
| —C$_n$H$_{2n}$—CH=CH$_2$ | —nV |
| —C$_m$H$_{2m}$—CH=CH—C$_n$H$_{2n+1}$ | —mVn |
| —CH=CF$_2$ | —VFF |
| —OCO—CH=CH$_2$ | —AC |
| —OCO—C(CH$_3$)=CH$_2$ | —MAC |

| 3) Bonding Group —Z$_n$— | Symbol |
|---|---|
| —C$_n$H$_{2n}$— | n |
| —COO— | E |
| —CH=CH— | V |
| —CH=CHO— | VO |
| —OCH=CH— | OV |
| —CH$_2$O— | 1O |
| —OCH$_2$— | O1 |

| 4) Ring —A$_n$— | Symbol |
|---|---|
| 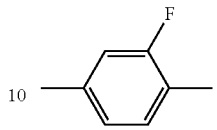 | H |
| 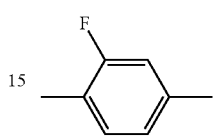 | B |

TABLE 3-continued

Method of Description of Compounds using Symbols
R—(A$_1$)—Z$_1$— . . . —Z$_n$—(A$_n$)—R'

| | |
|---|---|
| 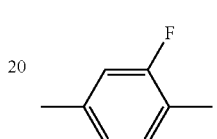 | B(F) |
| 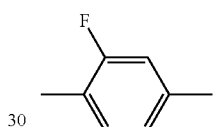 | B(2F) |
| 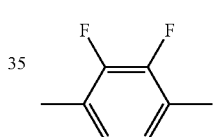 | B(F,F) |
| 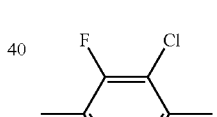 | B(2F,5F) |
| 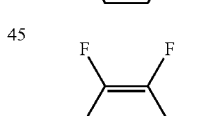 | B(2F,3F) |
| 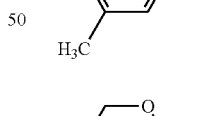 | B(2F,3CL) |
| 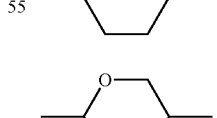 | B(2F,3F,6Me) |
| 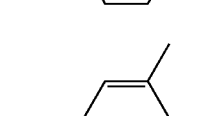 | dh |
|  | Dh |
|  | Bm |

TABLE 3-continued

Method of Description of Compounds using Symbols
R—(A₁)—Z₁— ... —Zₙ—(Aₙ)—R'

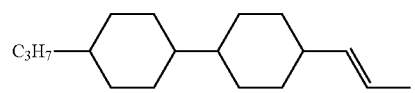
Cro(7F,8F)

5) Examples of Description

Example 1. 3-HH-V1

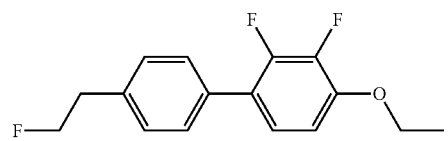

Example 2. F2-BB(2F,3F)—O2

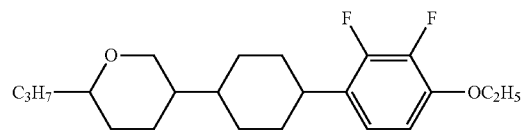

Example 3. 3-DhHB(2F,3F)—O2

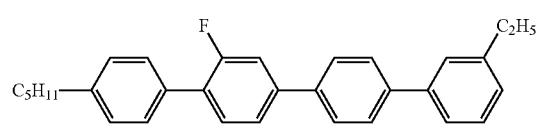

Example 4. 5-BB(2F)BBm-2

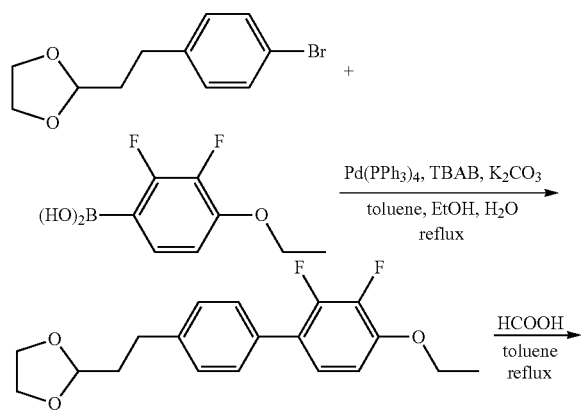

Example 1

Preparation of Compound (1-1)

4-ethoxy-2,3-difluoro-4'-(3-fluoropropyl)-1,1'-biphenyl

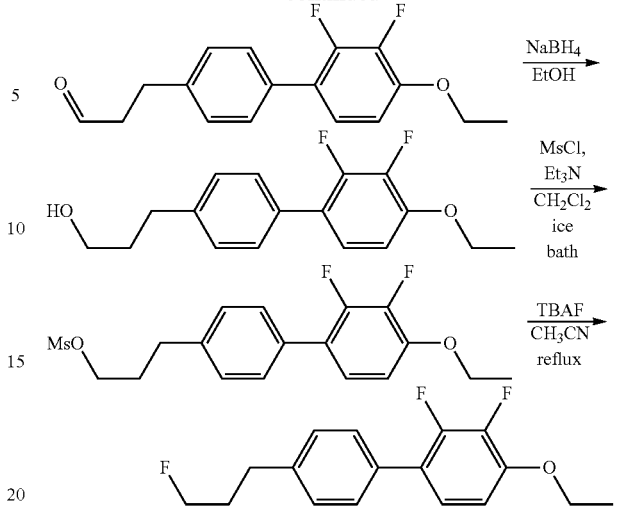

First Step:

A mixture of 2-(4-bromophenylethyl)-1,3-dioxolane (130.0 g, 505.6 mmol), (4-ethoxy-2,3-difluorophenyl)boronic acid (112.4 g, 556.4 mmol), tetrakis(triphenylphosphine)palladium (1.3 g, 1.12 mmol), tetrabutylammonium bromide (40.8 g, 126.6 mmol), potassium carbonate (104.9 g, 759.2 mmol) and a mixed solvent of toluene (500 ml), ethanol (50 ml) and water (500 ml) for 5 hours were refluxed in a reaction vessel under an atmosphere of nitrogen. The organic layer was washed with water and brine, and dried over anhydrous magnesium sulfate. The solvent was distilled off with a rotary evaporator under reduced pressure. The residue was purified by silica gel chromatography to give 2-(2-(4'-ethoxy-2',3'-difluoro-[1,1'-biphenyl]-4-yl)ethyl-1,3-dioxolane (146.4 g, yield 86.6%).

Second Step:

A mixture of 2-(2-(4'-ethoxy-2',3'-difluoro-[1,1'-biphenyl]-4-yl)ethyl-1,3-dioxolane (146.4 g, 437.9 mmol) obtained in the first step, 86% formic acid (146 ml, 3.33 mol) and toluene (500 ml) was refluxed for 3 hours in a reaction vessel under an atmosphere of nitrogen. The organic layer was washed with a saturated aqueous solution of sodium hydrogencarbonate, water and brine, and dried over anhydrous magnesium sulfate. The solvent was distilled off with a rotary evaporator under reduced pressure to give 3-(4'-ethoxy-2',3'-difluoro-[1,1'-biphenyl]-4-yl)propanal (125.1 g, yield 98.4%).

Third Step:

Sodium borohydride (18.2 g, 481.7 mmol) was added to an ethanol (500 ml) solution of 3-(4'-ethoxy-2',3'-difluoro-[1,1'-biphenyl]-4-yl)propanal (125.1 g, 430.9 mmol) obtained in the second step in a reaction vessel under ice-cooling under an atmosphere of nitrogen. The reaction mixture was stirred at room temperature for 5 hours, and poured into water, and then the mixture was extracted with ethyl acetate. The combined organic layers were washed with water and brine, and dried over anhydrous magnesium sulfate. The solvent was distilled off with a rotary evaporator under reduced pressure. The solvent was distilled off with a rotary evaporator under reduced pressure. The residue was purified by silica gel chromatography to give 3-(4'-ethoxy-2',3'-difluoro-[1,1'-biphenyl]-4-yl)propan-1-ol (110.5 g, yield 87.7%).

Fourth Step:

Methanesulfonyl chloride (21.6 g, 188.2 mmol) was added dropwise to a dichloromethane (300 ml) solution of 3-(4'-ethoxy-2',3'-difluoro-[1,1'-biphenyl]-4-yl)propan-1-ol (50 g, 171.1 mmol) obtained in the third step and triethylamine (19.0 g, 188.2 mmol) in a reaction vessel under ice-cooling under an atmosphere of nitrogen. The reaction mixture was stirred at room temperature for 8 hours, and quenched with water. The organic layer was washed with water, and dried over anhydrous magnesium sulfate. The solvent was distilled off with a rotary evaporator under reduced pressure. The residue was purified by silica gel chromatography to give 3-(4'-ethoxy-2',3'-difluoro-[1,1'-biphenyl]-4-yl)propyl methanesulfonate (55.6 g, yield 87.6%).

Fifth Step:

A THF solution of tetrabutylammonium fluoride (1.0 M, 162 ml, 162.0 mmol) was added to an acetonitrile (150 ml) solution of 3-(4'-ethoxy-2',3'-difluoro-[1,1'-biphenyl]-4-yl) propyl methanesulfonate (30 g, 81.0 mmol) obtained in the fourth step in a reaction vessel under an atmosphere of nitrogen, and the mixture was refluxed for 2 hours. The reaction mixture was poured into water and the mixture extracted with toluene. The combined organic layers were washed with water and brine, and dried over anhydrous magnesium sulfate. The residue was purified by silica gel chromatography to give compound (1-1), 4-ethoxy-2,3-difluoro-4'-(3-fluoropropyl)-1,1'-biphenyl (19.7 g, 82.6%).

$^1$H-NMR (CDCl$_3$): δ 7.44 (dd, 2H$^3$, J$_{HH}$=8.0 Hz, $^5$J$_{HH}$=1.2 Hz), 7.27 (dd, 2H, $^3$J$_{HH}$=8.0 Hz, $^5$J$_{HH}$=1.2 Hz), 7.08 (ddd, 1H, $^3$J$_{HH}$=8.4 Hz, $^4$J$_{HF}$=8.4 Hz, $^5$J$_{HF}$=1.9 Hz), 6.79 (ddd, 1H, $^3$J$_{HH}$=8.4 Hz, $^4$J$_{HF}$=8.4 Hz, $^5$J$_{HF}$=1.9 Hz), 4.49 (dt, 2H, $^3$J$_{HH}$=5.8 Hz, $^2$J$_{HF}$=47.3 Hz), 4.16 (q, 2H, $^3$J$_{HH}$=7.0 Hz), 2.79 (t, 2H, $^3$J$_{HH}$=7.5 Hz), 2.11-2.00 (m, 2H) and 1.48 (t, 3H, $^3$J$_{HH}$=7.0 Hz).

A liquid crystal composition was prepared from 15% by weight of the compound and 85% by weight of the mother liquid crystals. The characteristics of the composition were measured, and the characteristics of the compounds were calculated by extrapolating the measured values. The results were as follows.

Maximum temperature (NI)=−2.7° C.; dielectric anisotropy (Δ∈)=−6.29; optical anisotropy (Δn)=0.148; viscosity (η)=50.1 mPa·s.

Example 2

Preparation of Compound (1-1)

4-ethoxy-2,3-difluoro-4'-(2-fluoroethyl)-1,1'-biphenyl

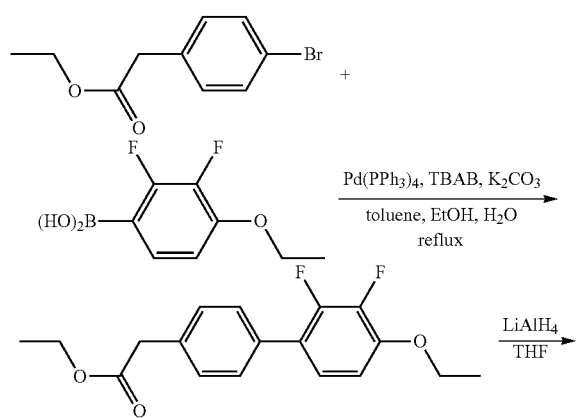

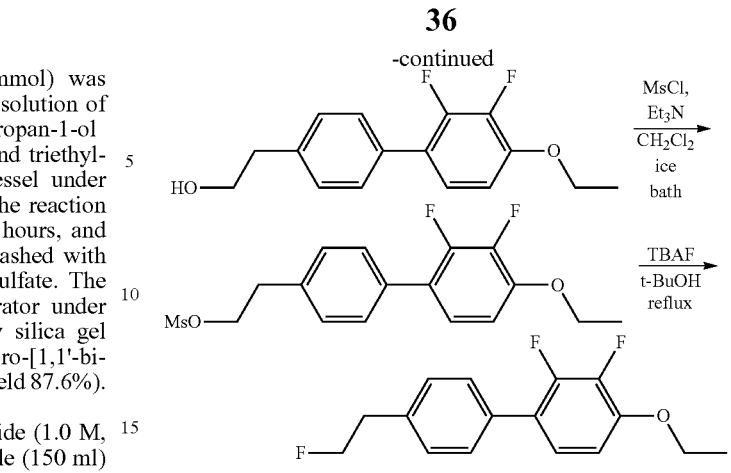

First Step:

A mixture of ethyl 4-bromophenylacetate (50.0 g, 205.7 mmol), (4-ethoxy-2,3-difluorophenyl)boronic acid (49.9 g, 246.8 mmol), tetrakis(triphenylphosphine)palladium (0.48 g, 0.41 mmol), tetrabutylammonium bromide (16.6 g, 51.4 mmol) and potassium carbonate (56.9 g, 411.4 mmol) and a mixed solvent of toluene (200 ml), ethanol (20 ml) and water (200 ml) were refluxed for 5 hours in a reaction vessel under an atmosphere of nitrogen. The organic layer was washed with water and brine, and dried over anhydrous magnesium sulfate. The solvent was distilled off with a rotary evaporator under reduced pressure. The residue was purified by silica gel chromatography to give ethyl 2-(4'-ethoxy-2',3'-difluoro-[1,1'-biphenyl]-4-yl)acetate (62.0 g, yield 90.0%).

Second Step:

A THF (200 ml) solution of ethyl 2-(4'-ethoxy-2',3'-difluoro-[1,1'-biphenyl]-4-yl)acetate (62.0 g, 193.4 mmol) obtained in the first step was added dropwise to a THF (200 ml) suspension of lithium aluminum hydride (4.4 g, 116.1 mmol) under ice cooling in a reaction vessel under an atmosphere of nitrogen. The reaction mixture was stirred at room temperature for 1 hour, and poured into water, and then the mixture was extracted with ethyl acetate. The combined organic layers were washed with water and brine, and dried over anhydrous magnesium sulfate. The solvent was distilled off with a rotary evaporator under reduced pressure. The residue was purified by silica gel chromatography to give 2-(4'-ethoxy-2',3'-difluoro-[1,1'-biphenyl]-4-yl)ethan-1-ol (45.5 g, yield 84.4%).

Third Step:

Methanesulfonyl chloride (20.6 g, 179.7 mmol) was added dropwise to a dichloromethane (300 ml) solution of 2-(4'-ethoxy-2',3'-difluoro-[1,1'-biphenyl]-4-yl)ethan-1-ol (45.5 g, 163.3 mmol) obtained in the second step and triethylamine (18.2 g, 179.7 mmol) in a reaction vessel under ice cooling under an atmosphere of nitrogen. The reaction mixture was stirred at room temperature for 8 hours, and quenched with water. The organic layer was washed with water, and dried over anhydrous magnesium sulfate. The solvent was distilled off with a rotary evaporator under reduced pressure. The residue was purified by silica gel chromatography to give 2-(4'-ethoxy-2',3'-difluoro-[1,1'-biphenyl]-4-yl)ethyl methanesulfonate (53.0 g, yield 92.6%).

Fourth Step:

A THF solution of tetrabutylammonium fluoride (1.0 M, 224.5 ml, 224.5 mmol) was added to a t-butanol (800 ml) solution of 2-(4'-ethoxy-2',3'-difluoro-[1,1'-biphenyl]-4-yl) ethyl methanesulfonate (40.0 g, 112.2 mmol) prepared in the third step, and the mixture was refluxed for 2 hours in a reaction vessel under an atmosphere of nitrogen. The reaction mixture was poured into water and the mixture extracted with toluene. The combined organic layers were washed with water and brine, and dried over anhydrous magnesium sulfate. The residue was purified by silica gel chromatography and then by recrystallization to give compound (1-1), 4-ethoxy-2,3-difluoro-4'-(2-fluoroethyl)-1,1'-biphenyl (11.2 g, yield 35.5%).

$^1$H-NMR (CDCl$_3$): δ 7.46 (dd, 2H, $^3J_{HH}$=8.2 Hz, $^5J_{HH}$=1.2 Hz), 7.31 (dd, 2H, $^3J_{HH}$=8.2 Hz, $^5J_{HH}$=1.2 Hz), 7.08 (ddd, 1H, $^3J_{HH}$=8.8 Hz, $^4J_{HF}$=8.8 Hz, $^5J_{HF}$=1.9 Hz), 6.79 (ddd, 1H, $^3J_{HH}$=8.8 Hz, $^4J_{HF}$=8.8 Hz, $^5J_{HF}$=1.9 Hz), 4.67 (dt, 2H, $^3J_{HH}$=6.5 Hz, $^2J_{HF}$=47.0 Hz), 4.16 (q, 2H, $^3J_{HH}$=7.0 Hz), 3.06 (dt, 2H, $^3J_{HH}$=6.5 Hz, $^2J_{HF}$=23.6 Hz) and 1.48 (t, 3H, J$_{HH}$=7.0 Hz).

A liquid crystal composition was prepared from 15% by weight of the compound and 85% by weight of the mother liquid crystals. The characteristics of the composition were measured, and the characteristics of the compounds were calculated by extrapolating the measured values. The results were as follows.

Maximum temperature (NI)=−20.7° C.; dielectric anisotropy (Δ∈)=−4.68; optical anisotropy (Δn)=0.135; viscosity (η)=53.8 mPa·s.

Example M1

The composition having negative dielectric anisotropy of the invention was prepared, and the characteristics were measured.

| F2-BB(2F,3F)-O2 | (1-1) | 4% |
| F3-BB(2F,3F)-O2 | (1-1) | 8% |
| 3-HH-V | (2-1) | 29% |
| 3-HH-V1 | (2-1) | 5% |
| 1-BB-3 | (2-3) | 5% |
| V-HHB-1 | (2-5) | 6% |
| V-HB(2F,3F)-O2 | (3-1) | 4% |
| 3-HHB(2F,3F)-O2 | (3-6) | 4% |
| V-HHB(2F,3F)-O1 | (3-6) | 5% |
| V-HHB(2F,3F)-O2 | (3-6) | 13% |
| V-HHB(2F,3F)-O4 | (3-6) | 8% |
| 2-BB(2F,3F)B-3 | (3-9) | 3% |
| V-HBB(2F,3F)-O2 | (3-13) | 6% |

NI=75.3° C.; Tc<−20° C.; Δn=0.112; Δ∈=−2.9; Vth=2.31 V; η=22.3 mPa·s; VHR-1a=95.6%; VHR-3a=78.5%.

Comparative Example M1

A composition that did not comprise compound (1-1) and had negative dielectric anisotropy was prepared, and the characteristics were measured.

| 3-HH-V | (2-1) | 29% |
| 3-HH-V1 | (2-1) | 5% |
| 1-BB-3 | (2-3) | 5% |
| V-HHB-1 | (2-5) | 6% |
| V-HB(2F,3F)-O2 | (3-1) | 4% |
| V2-BB(2F,3F)-O2 | (3-4) | 4% |
| V2-BB(2F,3F)-O4 | (3-4) | 8% |
| 3-HHB(2F,3F)-O2 | (3-6) | 4% |
| V-HHB(2F,3F)-O1 | (3-6) | 5% |
| V-HHB(2F,3F)-O2 | (3-6) | 13% |
| V-HHB(2F,3F)-O4 | (3-6) | 8% |
| 2-BB(2F,3F)B-3 | (3-9) | 3% |
| V-HBB(2F,3F)-O2 | (3-13) | 6% |

NI=77.5° C.; Tc<−20° C.; Δn=0.113; Δ∈=2.8; Vth=2.29 V; η=20.2 mPa·s; VHR-1a=94.9%; VHR-3a=67.8%.

The voltage holding ratio (VHR-1a) of the composition in Example M1 was 95.6%, and that of the composition in Comparative Example M1 was 94.9%. The voltage holding ratio (VHR-3a) of the composition in Example M1 was 78.5%, and that of the composition in Comparative Example M1 was 67.8%. From these results, it was found that the TN device in Example M1 had a large voltage holding ratio and a high stability to ultraviolet light in comparison with that in Comparative Example M1.

In the following, the compositions having negative dielectric anisotropy of the invention were prepared in Examples M2 to M13 by a method similar to that in Example M1, and the characteristics were measured.

Example M2

| F3-BB(2F,3F)-O2 | (1-1) | 6% |
| 2-HH-3 | (2-1) | 20% |
| 3-HH-4 | (2-1) | 7% |
| 3-HB-O2 | (2-2) | 5% |
| 1-BB-3 | (2-3) | 8% |
| V-HHB-1 | (2-5) | 5% |
| 3-HBB-2 | (2-6) | 2% |
| 5-B(F)BB-2 | (2-7) | 3% |
| V-HB(2F,3F)-O2 | (3-1) | 2% |
| 3-H1OB(2F,3F)-O2 | (3-3) | 7% |
| 3-HHB(2F,3F)-O2 | (3-6) | 7% |
| V-HHB(2F,3F)-O1 | (3-6) | 5% |
| V2-HHB(2F,3F)-O2 | (3-6) | 8% |
| V-HHB(2F,3F)-O2 | (3-6) | 10% |
| V-HBB(2F,3F)-O2 | (3-13) | 5% |

NI=76.5° C.; Tc<−20° C.; Δ=0.112; Δ∈=−3.0; Vth=2.26 V; η=23.1 mPa·s.

Example M3

| F3-BB(2F,3F)-O2 | (1-1) | 8% |
| 3-HH-V | (2-1) | 26% |
| 1-HH-2V1 | (2-1) | 5% |
| 3-HB-O2 | (2-2) | 3% |
| 3-HHB-O1 | (2-5) | 5% |
| V-HHB-1 | (2-5) | 6% |
| 3-H1OB(2F,3F)-O2 | (3-3) | 6% |
| 2-BB(2F,3F)-O2 | (3-4) | 4% |
| V2-BB(2F,3F)-O2 | (3-4) | 5% |
| V-HHB(2F,3F)-O2 | (3-6) | 6% |
| V-HHB(2F,3F)-O4 | (3-6) | 4% |
| 2-HH1OB(2F,3F)-O2 | (3-8) | 7% |
| 3-HH1OB(2F,3F)-O2 | (3-8) | 15% |

NI=75.5° C.; Tc<−20° C.; Δn=0.102; Δ∈=−3.8; Vth=1.95 V; η=23.0 mPa·s.

Example M4

| F3-BB(2F,3F)-O2 | (1-1) | 7% |
| 2-HH-3 | (2-1) | 19% |
| 3-HH-4 | (2-1) | 6% |
| 3-HH-V | (2-1) | 8% |
| V2-BB-1 | (2-3) | 3% |
| 1-BB-5 | (2-3) | 7% |
| 3-HHB-O1 | (2-5) | 3% |
| 3-HBB-2 | (2-6) | 3% |

-continued

| | | |
|---|---|---|
| 5-B(F)BB-2 | (2-7) | 3% |
| 5-HBBH-3 | (2-11) | 3% |
| 3-BB(2F,3F)-O2 | (3-4) | 5% |
| 2O-BB(2F,3F)-O2 | (3-4) | 3% |
| 2-HH1OB(2F,3F)-O2 | (3-8) | 10% |
| 3-HH1OB(2F,3F)-O2 | (3-8) | 20% |

NI=76.4° C.; Tc<−20° C.; Δn=0.112; Δ∈=−2.7; Vth=2.41 V; η=21.8 mPa·s.

Example M5

| | | |
|---|---|---|
| F2-BB(2F,3F)-O2 | (1-1) | 8% |
| 2-HH-3 | (2-1) | 21% |
| 3-HH-V | (2-1) | 10% |
| 1-BB-3 | (2-3) | 6% |
| 1V2-BB-1 | (2-3) | 3% |
| V2-HHB-1 | (2-5) | 5% |
| 3-HBB-2 | (2-6) | 4% |
| 5-B(F)BB-3 | (2-7) | 3% |
| 2-H1OB(2F,3F)-O2 | (3-3) | 6% |
| 2-HH1OB(2F,3F)-O2 | (3-8) | 10% |
| 3-HH1OB(2F,3F)-O2 | (3-8) | 21% |
| 1O1-HBBH-4 | (—) | 3% |

NI=75.1° C.; Tc<−20° C.; Δn=0.106; Δ∈=−2.9; Vth=2.32 V; η=23.9 mPa·s.

Example M6

| | | |
|---|---|---|
| F3-BB(2F,3F)-O2 | (1-1) | 5% |
| 3-HH-V | (2-1) | 26% |
| 1-BB-3 | (2-3) | 6% |
| V-HHB-1 | (2-5) | 5% |
| 1-BB(F)B-2V | (2-8) | 3% |
| 3-HHEBH-4 | (2-9) | 3% |
| V-HB(2F,3F)-O2 | (3-1) | 6% |
| 3-HB(2F,3F)-O2 | (3-1) | 6% |
| 1V2-BB(2F,3F)-O2 | (3-4) | 6% |
| V-HHB(2F,3F)-O1 | (3-6) | 6% |
| V-HHB(2F,3F)-O2 | (3-6) | 12% |
| V-HHB(2F,3F)-O4 | (3-6) | 5% |
| 3-HDhB(2F,3F)-O2 | (3-11) | 7% |
| 3-dhBB(2F,3F)-O2 | (3-14) | 4% |

NI=77.0° C.; Tc<−20° C.; Δn=0.115; Δ∈=−3.0; Vth=2.30 V; η=24.8 mPa·s.

Example M7

| | | |
|---|---|---|
| F2-BB(2F,3F)-O2 | (1-1) | 5% |
| 3-HH-V | (2-1) | 30% |
| V2-HB-1 | (2-2) | 6% |
| V-HHB-1 | (2-5) | 5% |
| 2-BB(F)B-5 | (2-8) | 3% |
| 5-HBB(F)B-3 | (2-13) | 3% |
| 1V2-BB(2F,3F)-O4 | (3-4) | 5% |
| V-HHB(2F,3F)-O1 | (3-6) | 6% |
| V-HHB(2F,3F)-O2 | (3-6) | 7% |
| V2-HHB(2F,3F)-O2 | (3-6) | 5% |
| 1V2-HHB(2F,3F)-O2 | (3-6) | 5% |
| 3-HDhB(2F,3F)-O2 | (3-11) | 5% |
| 3-dhBB(2F,3F)-O2 | (3-14) | 5% |
| F2-HB(2F,3F)-O2 | (—) | 10% |

NI=77.9° C.; Tc<−20° C.; Δn=0.110; Δ∈=−2.9; Vth=2.36 V; η=22.8 mPa·s.

Example M8

| | | |
|---|---|---|
| F3-BB(2F,3F)-O2 | (1-1) | 5% |
| 3-HH-V | (2-1) | 25% |
| 3-HH-VFF | (2-1) | 3% |
| 5-HH-O1 | (2-1) | 4% |
| 1-BB-3 | (2-3) | 6% |
| 3-HHEH-3 | (2-4) | 3% |
| V-HHB-1 | (2-5) | 5% |
| 3-H2B(2F,3F)-O2 | (3-2) | 10% |
| 5-H2B(2F,3F)-O2 | (3-2) | 4% |
| V2-BB(2F,3F)-O2 | (3-4) | 5% |
| V2-HHB(2F,3F)-O2 | (3-6) | 5% |
| 3-HH2B(2F,3F)-O2 | (3-7) | 5% |
| 3-HDhB(2F,3F)-O2 | (3-11) | 5% |
| 3-HBB(2F,3F)-O2 | (3-13) | 3% |
| V-HBB(2F,3F)-O2 | (3-13) | 6% |
| V2-HBB(2F,3F)-O2 | (3-13) | 6% |

NI=77.0° C.; Tc<−20° C.; Δn=0.106; Δ∈=−2.7; Vth=2.37 V; η=18.4 mPa·s.

Example M9

| | | |
|---|---|---|
| F3-BB(2F,3F)-O2 | (1-1) | 5% |
| 3-HH-V | (2-1) | 26% |
| 1-BB-3 | (2-3) | 6% |
| 3-HHB-1 | (2-5) | 3% |
| V-HHB-1 | (2-5) | 7% |
| 3-HBB-2 | (2-6) | 3% |
| 3-B(2F,3F)B(2F,3F)-O2 | (3-5) | 6% |
| 1V2-BB(2F,3F)-O2 | (3-4) | 4% |
| V-HHB(2F,3F)-O1 | (3-6) | 6% |
| V-HHB(2F,3F)-O2 | (3-6) | 10% |
| V-HHB(2F,3F)-O4 | (3-6) | 5% |
| 3-HH1OB(2F,3F)-O2 | (3-8) | 3% |
| 3-HHB(2F,3CL)-O2 | (3-16) | 3% |
| 5-HBB(2F,3CL)-O2 | (3-17) | 3% |
| 3-H1OCro(7F,8F)-5 | (3-18) | 7% |
| 3-HH1OCro(7F,8F)-5 | (3-19) | 3% |

NI=75.3° C.; Tc<−20° C.; Δn=0.111; Δ∈=−3.4; Vth=2.23 V; η=32.0 mPa·s.

Example M10

| | | |
|---|---|---|
| F3-BB(2F,3F)-O2 | (1-1) | 5% |
| 2-HH-3 | (2-1) | 22% |
| 3-HH-V | (2-1) | 8% |
| 1-BB-3 | (2-3) | 5% |
| 3-HHB-3 | (2-5) | 3% |
| 3-B(F)BB-2 | (2-7) | 3% |
| 3-HB(F)HH-5 | (2-10) | 3% |
| 3-HB(F)BH-3 | (2-12) | 3% |
| V2-HB(2F,3F)-O2 | (3-1) | 5% |
| 3-H2B(2F,3F)-O2 | (3-2) | 9% |
| V-HHB(2F,3F)-O2 | (3-6) | 12% |
| V-HH1OB(2F,3F)-O2 | (3-8) | 7% |
| 3-HH1OB(2F,3F)-O2 | (3-8) | 12% |
| 3-HDhB(2F,3F)-O2 | (3-11) | 3% |

NI=79.1° C.; Tc<−20° C.; Δn=0.102; Δ∈=−3.4; Vth=2.15 V; η=25.2 mPa·s.

Example M11

| | | |
|---|---|---|
| F3-BB(2F,3F)-O2 | (1-1) | 5% |
| 2-HH-3 | (2-1) | 22% |
| 3-HH-V | (2-1) | 8% |
| 1-BB-3 | (2-3) | 10% |
| 3-HHB-1 | (2-5) | 3% |
| 3-HB(F)HH-5 | (2-10) | 3% |
| 3-HB(F)BH-3 | (2-12) | 3% |
| 1V2-HB(2F,3F)-O2 | (3-1) | 4% |
| 5-H2B(2F,3F)-O2 | (3-2) | 9% |
| 2-HHB(2F,3F)-O2 | (3-6) | 3% |
| V-HHB(2F,3F)-O2 | (3-6) | 6% |
| 2-HH1OB(2F,3F)-O2 | (3-8) | 7% |
| 3-HH1OB(2F,3F)-O2 | (3-8) | 8% |
| 2-BB(2F,3F)B-3 | (3-9) | 3% |
| 2-HHB(2F,3CL)-O2 | (3-16) | 3% |
| 4-HHB(2F,3CL)-O2 | (3-16) | 3% |

NI=74.0° C.; Tc<−20° C.; Δn=0.103; Δ∈=−2.9; Vth=2.30 V; η=24.9 mPa·s.

Example M12

| | | |
|---|---|---|
| F3-BB(2F,3F)-O2 | (1-1) | 5% |
| 3-HH-V | (2-1) | 27% |
| 4-HH-V1 | (2-1) | 6% |
| 3-HH-2V1 | (2-1) | 3% |
| 3-HBB-2 | (2-6) | 7% |
| 5-HBB(F)B-2 | (2-13) | 3% |
| 3-HB(2F,3F)-O4 | (3-1) | 5% |
| V-HB(2F,3F)-O2 | (3-1) | 6% |
| V2-BB(2F,3F)-O2 | (3-4) | 5% |
| 1V2-BB(2F,3F)-O2 | (3-4) | 5% |
| 2O-B(2F,3F)B(2F,3F)-O6 | (3-5) | 3% |
| 3-HH2B(2F,3F)-O2 | (3-7) | 5% |
| 3-HH1OB(2F,3F)-O2 | (3-8) | 14% |
| 3-HEB(2F,3F)B(2F,3F)-O2 | (3-15) | 6% |

NI=75.0° C.; Tc<−20° C.; Δn=0.111; Δ∈=−3.5; Vth=2.01 V; η=24.0 mPa·s.

Example M13

| | | |
|---|---|---|
| F3-BB(2F,3F)-O2 | (1-1) | 5% |
| 3-HH-V | (2-1) | 29% |
| 3-HH-O1 | (2-1) | 3% |
| 3-HB-O2 | (2-2) | 3% |
| V-HHB-1 | (2-5) | 8% |
| 3-BB(F)B-5 | (2-8) | 3% |
| 5-HBB(F)B-2 | (2-13) | 2% |
| 3-HB(2F,3F)-O2 | (3-1) | 6% |
| V-HB(2F,3F)-O2 | (3-1) | 7% |
| V2-BB(2F,3F)-O2 | (3-4) | 3% |
| V-HHB(2F,3F)-O2 | (3-6) | 10% |
| 3-HH1OB(2F,3F)-O2 | (3-8) | 12% |
| 4-HBB(2F,3F)-O2 | (3-13) | 6% |
| 3-HBB(2F,3CL)-O2 | (3-17) | 3% |

NI=77.1° C.; Tc<−20° C.; Δn=0.107; Δ∈=−3.1; Vth=2.22 V; η=22.7 mPa·s.

Example M14

| | | |
|---|---|---|
| F3-BB(2F,3F)-O2 | (1-1) | 5% |
| 3-HH-V | (2-1) | 22% |
| 4-HH-V | (2-1) | 3% |
| 5-HH-V | (2-1) | 6% |
| 7-HB-1 | (2-2) | 3% |
| V-HHB-1 | (2-5) | 5% |
| 3-HBB-2 | (2-6) | 3% |
| 2-BB(F)B-3 | (2-8) | 3% |
| 3-BB(2F,3F)-O4 | (3-4) | 5% |
| V2-BB(2F,3F)-O2 | (3-4) | 3% |
| 1V2-BB(2F,3F)-O1 | (3-4) | 4% |
| 3-HHB(2F,3F)-O2 | (3-6) | 5% |
| V-HHB(2F,3F)-O1 | (3-6) | 6% |
| V-HHB(2F,3F)-O2 | (3-6) | 12% |
| 3-HDhB(2F,3F)-O2 | (3-11) | 5% |
| 3-HEB(2F,3F)B(2F,3F)-O2 | (3-15) | 5% |
| F3-HB(2F,3F)-O2 | (—) | 5% |

5-BB(2F)BBm-2 was added to the preceding composition having negative dielectric anisotropy in the ratio of 0.3% by weight, and the characteristics were measured.

NI=77.1° C.; Tc<−20° C.; Δn=0.113; Δ∈=−3.3; Vth=2.25 V; η=26.0 mPa·s.

INDUSTRIAL APPLICABILITY

The liquid crystal composition of the invention satisfies at least one of characteristics such as a high maximum temperature, a low minimum temperature, a small viscosity, a suitable optical anisotropy, a large negative dielectric anisotropy, a large specific resistance, a high stability to ultraviolet light and a high stability to heat, or is suitably balanced between at least two of the characteristics. A liquid crystal display device comprising this composition can be used for a liquid crystal projector, a liquid crystal television and so forth, since it has a short response time, a large voltage holding ratio, a low threshold voltage, a large contrast ratio and a long service life.

What is claimed is:

1. A liquid crystal composition, having negative dielectric anisotropy, and comprising: a first component that comprises at least one compound represented by formula (1-1) in a ratio in a range of 3% by weight to 30% by weight based on a weight of the liquid crystal composition, and a second component that comprises at least one compound represented by formula (2-1),

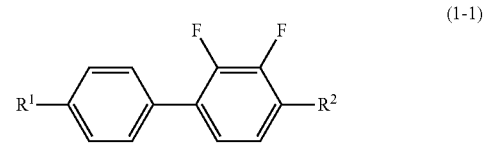
(1-1)

in formula (1-1), $R^1$ is $F—(CH_2)_2—$ or $F—(CH_2)_3—$ and $R^2$ is alkoxy having 1 to 12 carbons;

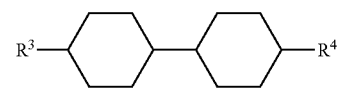
(2-1)

in formula (2-1), $R^3$ and $R^4$ are independently alkyl having 1 to 12 carbons, alkoxy having 1 to 12 carbons, alkenyl having 2 to 12 carbons, alkyl having 1 to 12 carbons in which at least one hydrogen has been replaced by fluorine, or alkenyl having 2 to 12 carbons in which at least one hydrogen has been replaced by fluorine.

2. The liquid crystal composition according to claim 1, wherein the second component further comprises at least one compound selected from the group consisting of compounds represented by formula (2-2) to formula (2-13):

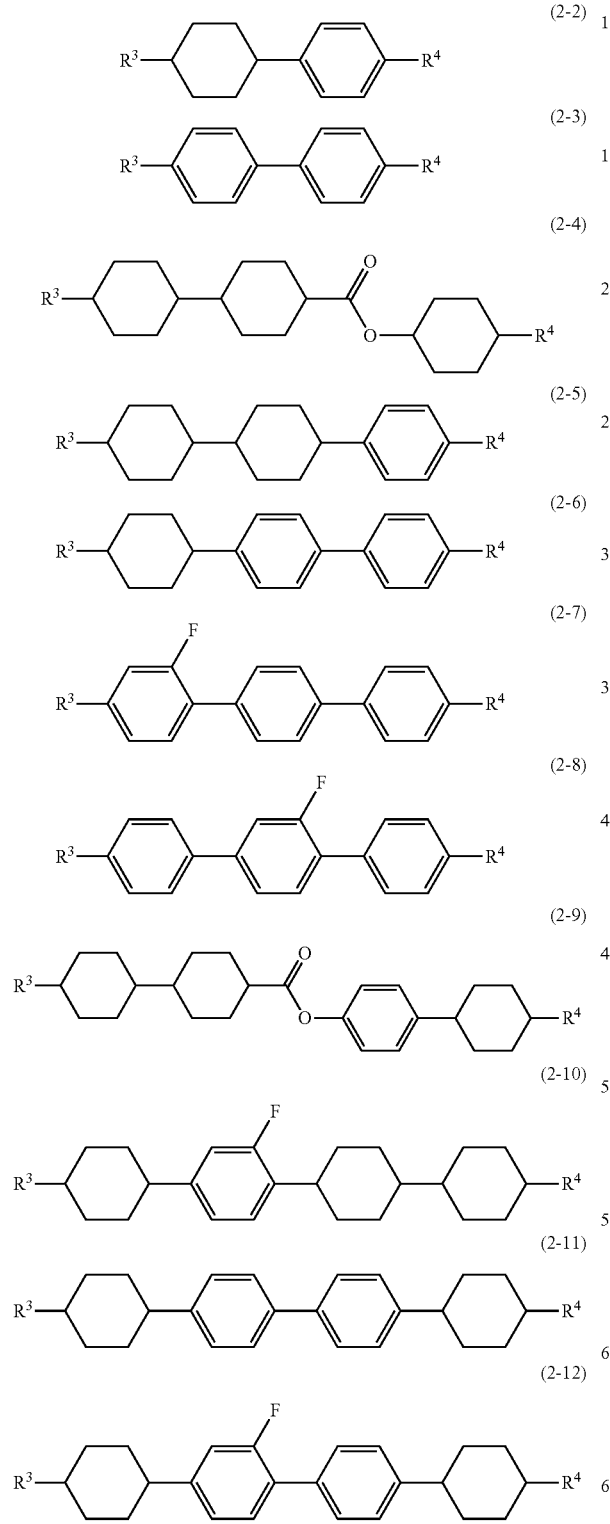

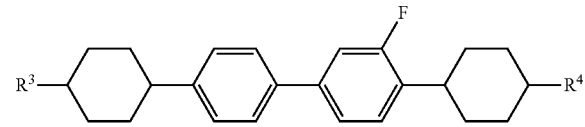

in formula (2-2) to formula (2-13), $R^3$ and $R^4$ are independently alkyl having 1 to 12 carbons, alkoxy having 1 to 12 carbons, alkenyl having 2 to 12 carbons, alkyl having 1 to 12 carbons in which at least one hydrogen has been replaced by fluorine or alkenyl having 2 to 12 carbons in which at least one hydrogen has been replaced by fluorine.

3. The liquid crystal composition according to claim 1, wherein the ratio of the second component is in the range of 10% by weight to 90% by weight based on the weight of the liquid crystal composition.

4. The liquid crystal composition according to claim 1, comprising at least one compound selected from the group consisting of compounds represented by formula (3) as a third component:

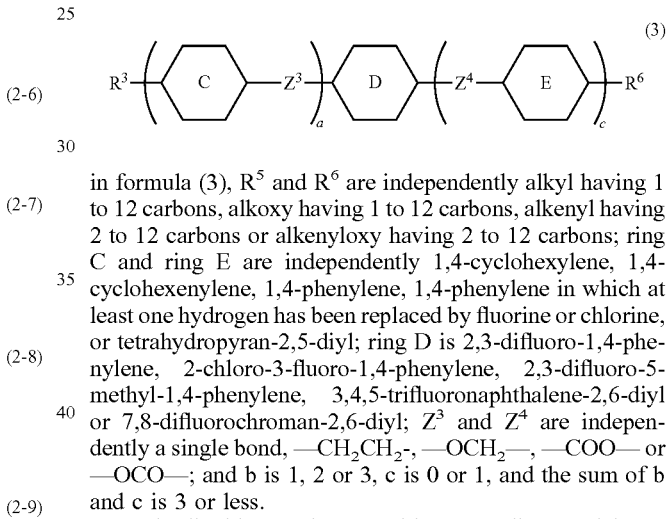

in formula (3), $R^5$ and $R^6$ are independently alkyl having 1 to 12 carbons, alkoxy having 1 to 12 carbons, alkenyl having 2 to 12 carbons or alkenyloxy having 2 to 12 carbons; ring C and ring E are independently 1,4-cyclohexylene, 1,4-cyclohexenylene, 1,4-phenylene, 1,4-phenylene in which at least one hydrogen has been replaced by fluorine or chlorine, or tetrahydropyran-2,5-diyl; ring D is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^3$ and $Z^4$ are independently a single bond, —CH$_2$CH$_2$-, —OCH$_2$—, —COO— or —OCO—; and b is 1, 2 or 3, c is 0 or 1, and the sum of b and c is 3 or less.

5. The liquid crystal composition according to claim 1, comprising at least one compound selected from the group consisting of compounds represented by formula (3-1) to formula (3-19) as a third component:

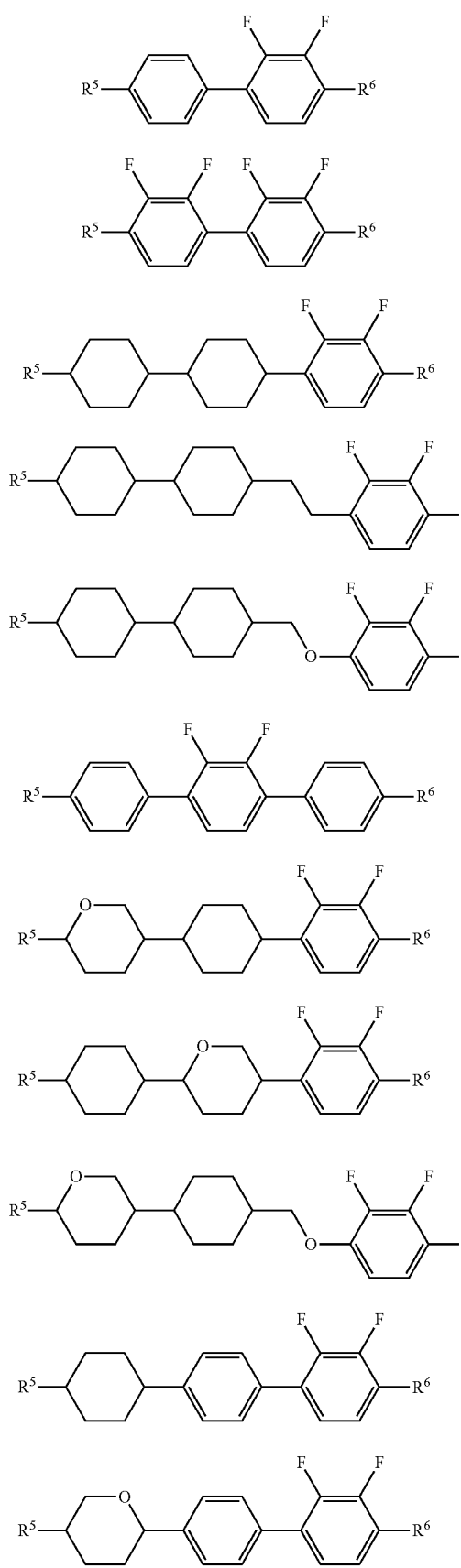
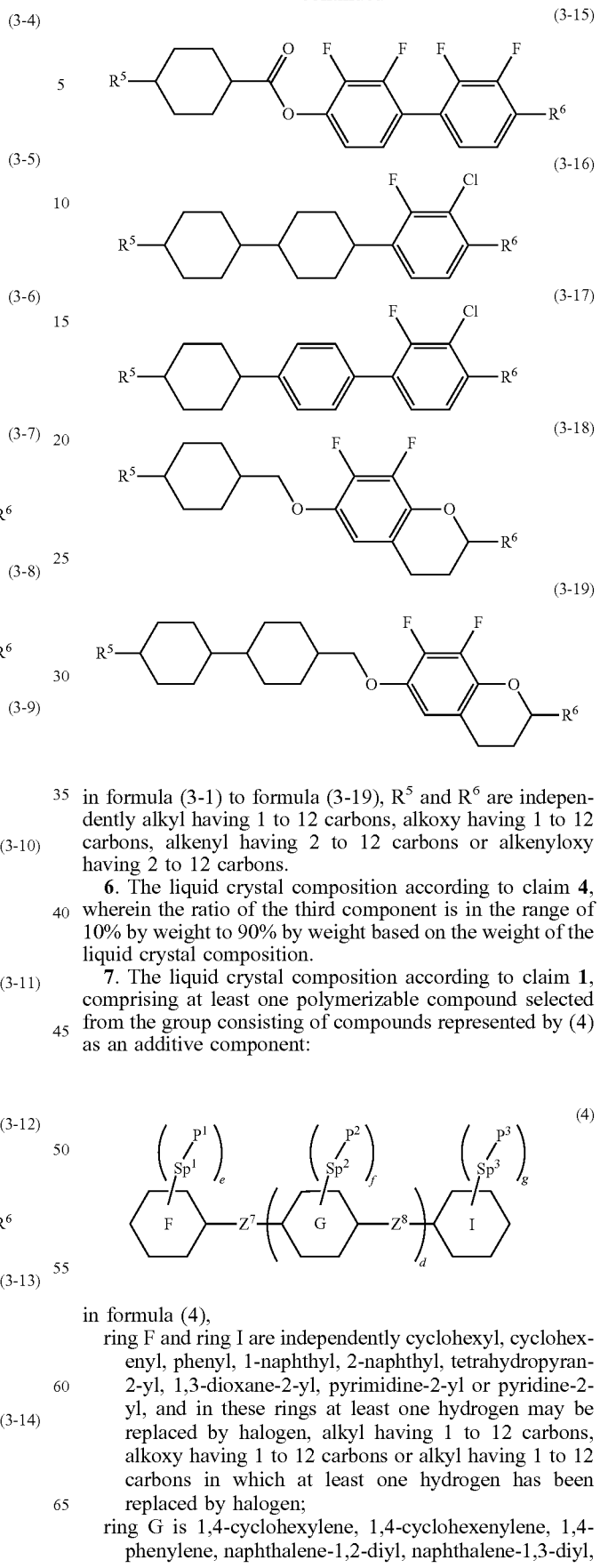

in formula (3-1) to formula (3-19), $R^5$ and $R^6$ are independently alkyl having 1 to 12 carbons, alkoxy having 1 to 12 carbons, alkenyl having 2 to 12 carbons or alkenyloxy having 2 to 12 carbons.

6. The liquid crystal composition according to claim 4, wherein the ratio of the third component is in the range of 10% by weight to 90% by weight based on the weight of the liquid crystal composition.

7. The liquid crystal composition according to claim 1, comprising at least one polymerizable compound selected from the group consisting of compounds represented by (4) as an additive component:

in formula (4),
ring F and ring I are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in these rings at least one hydrogen may be replaced by halogen, alkyl having 1 to 12 carbons, alkoxy having 1 to 12 carbons or alkyl having 1 to 12 carbons in which at least one hydrogen has been replaced by halogen;
ring G is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in these rings at least one hydrogen may be replaced by halogen, alkyl having 1 to 12 carbons, alkoxy having 1 to 12 carbons or alkyl having 1 to 12 carbons in which at least one hydrogen has been replaced by halogen;

$Z^7$ and $Z^8$ are independently a single bond or alkylene having 1 to 10 carbons, and in the alkylene at least one —CH$_2$— may be replaced by —O—, —CO—, —COO— or —OCO—, and at least one —CH$_2$—CH$_2$— may be replaced by —CH═CH—, —C(CH$_3$)═CH—, —CH═C(CH$_3$)— or —C(CH$_3$)═C(CH$_3$)—, and in these groups at least one hydrogen may be replaced by fluorine or chlorine;

$P^1$, $P^2$ and $P^3$ are independently a polymerizable group;

$Sp^1$, $Sp^2$ and $Sp^3$ are independently a single bond or alkylene having 1 to 10 carbons, and in the alkylene at least one —CH$_2$— may be replaced by —O—, —COO—, —OCO— or —OCOO—, and at least one —CH$_2$—CH$_2$— may be replaced by —CH═CH— or —C≡C—, and in these groups at least one hydrogen may be replaced by fluorine or chlorine;

d is 0, 1 or 2; and e, f and g are independently 0, 1, 2, 3 or 4, and the sum of e, f and g is 1 or more.

8. The liquid crystal composition according to claim 7, wherein in formula (4), $P^1$, $P^2$ and $P^3$ are independently a polymerizable group selected from the group consisting of groups represented by formula (P-1) to formula (P-6):

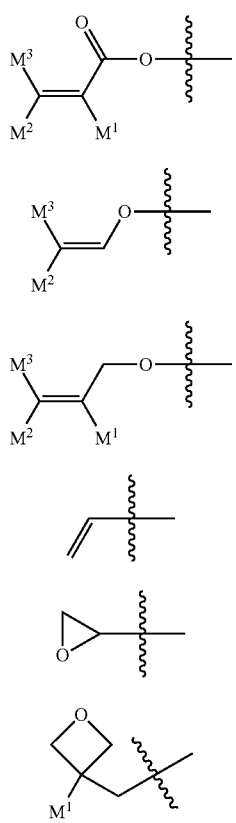

in formula (P-1) to formula (P-6), $M^1$, $M^2$ and $M^3$ are independently hydrogen, fluorine, alkyl having 1 to 5 carbons or alkyl having 1 to 5 carbons in which at least one hydrogen has been replaced by halogen; and at least one of $Sp^1$ and $Sp^3$ is alkylene in which at least one —CH$_2$— has been replaced by —O—, —COO—, —OCO— or —OCOO— when both $P^1$ and $P^3$ are a group represented by formula (P-4).

9. The liquid crystal composition according to claim 1, comprising at least one polymerizable compound selected from the group consisting of compounds represented by formula (4-1) to formula (4-27) as an additive component:

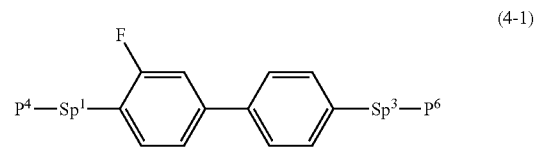

(4-1)

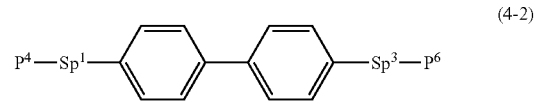

(4-2)

(4-3)

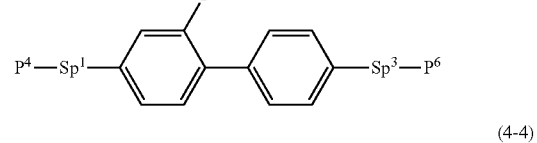

(4-4)

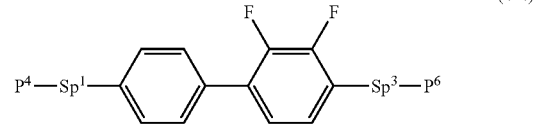

(4-5)

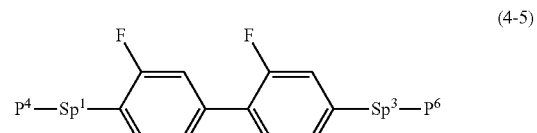

(4-6)

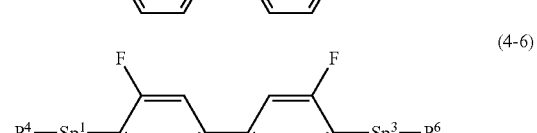

(4-7)

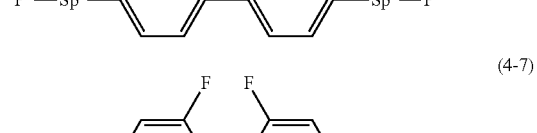

(4-8)

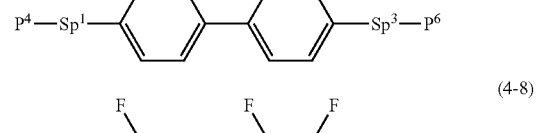

(4-9)

(4-10)
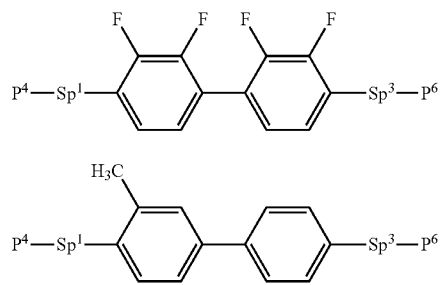
(4-11)
(4-12)
(4-13)
(4-14)
(4-15)
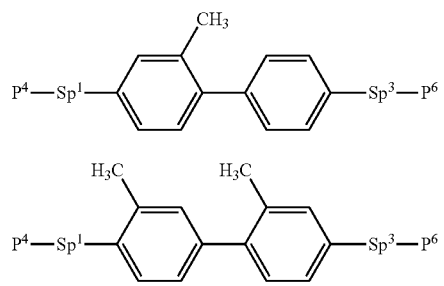
(4-16)
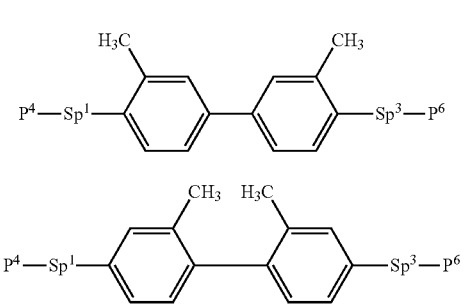
(4-17)
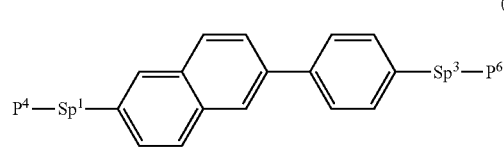
(4-18)
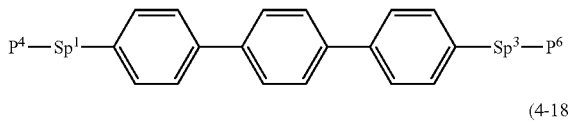
(4-19)
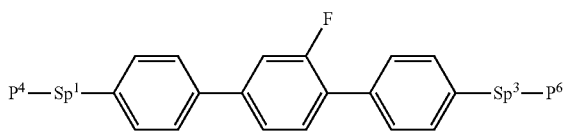
(4-20)
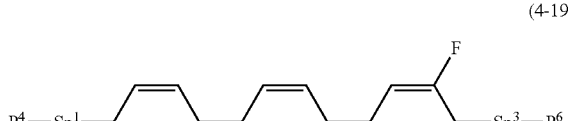
(4-21)
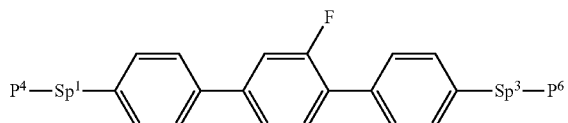
(4-22)
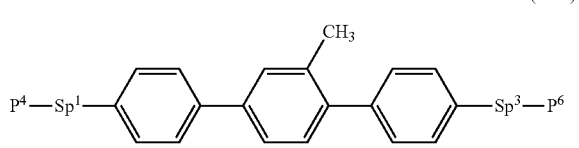
(4-23)
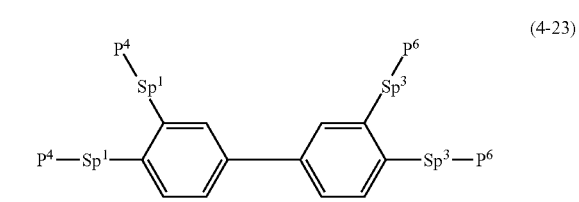
(4-24)
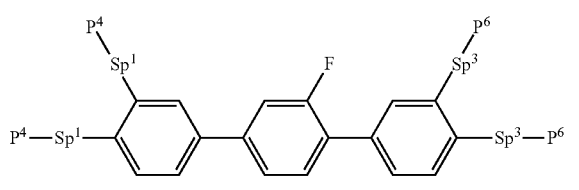
(4-25)
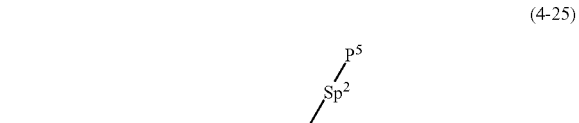
(4-26)
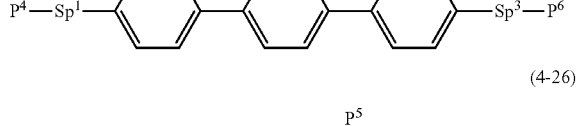
(4-27)
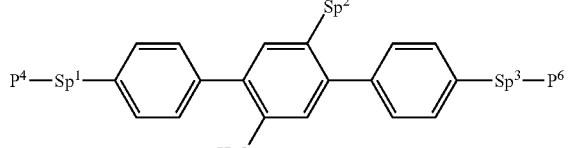
in formula (4-1) to formula (4-27), $P^4$, $P^5$ and $P^6$ are independently a polymerizable group selected from the group consisting of groups represented by formula (P-1) to formula (P-3);

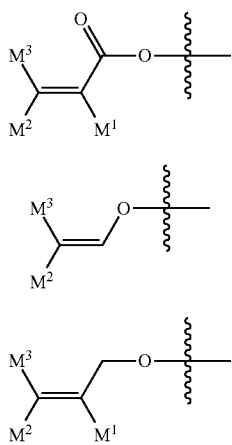

(P-1)

(P-2)

(P-3)

in formula (P-1) to formula (P-3), $M^1$, $M^2$ and $M^3$ are independently hydrogen, fluorine, alkyl having 1 to 5 carbons, or alkyl having 1 to 5 carbons in which at least one hydrogen has been replaced by halogen; and $Sp^1$, $Sp^2$ and $Sp^a$ are independently a single bond or alkylene having 1 to 10 carbons, and in the alkylene at least one —$CH_2$— may be replaced by —O—, —COO—, —OCO— or —OCOO—, and at least one —$CH_2$—$CH_2$— may be replaced by —CH═CH— or —C≡C—, and in these groups at least one hydrogen may be replaced by fluorine or chlorine.

10. The liquid crystal composition according to claim 7, wherein the ratio of the additive component is in the range of 0.03% by weight to 10% by weight based on the weight of the liquid crystal composition.

11. A liquid crystal display device comprising the liquid crystal composition according to claim 1.

12. The liquid crystal display device according to claim 11, wherein the operating mode of the liquid crystal display device is an IPS mode, a VA mode, an FFS mode or an FPA mode, and the driving mode of the liquid crystal display device is an active matrix mode.

13. A polymer sustained alignment (PSA) liquid crystal display device, comprising the liquid crystal composition according to claim 7, where the polymerizable compound in the liquid crystal composition has been polymerized.

14. A method for using the liquid crystal composition according to claim 1, including pouring the liquid crystal composition into a liquid crystal display device.

15. A method for using the liquid crystal composition according to claim 7, including pouring the liquid crystal composition into a polymer sustained alignment (PSA) liquid crystal display device.

* * * * *